United States Patent
Marks et al.

(10) Patent No.: US 9,573,056 B2
(45) Date of Patent: Feb. 21, 2017

(54) EXPANDABLE CONTROL DEVICE VIA HARDWARE ATTACHMENT

(75) Inventors: Richard Marks, Pleasanton, CA (US);
Anton Mikhailov, Campbell, CA (US);
Ennin Huang, Santa Clara, CA (US);
Gary M. Zalewski, Oakland, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 1650 days.

(21) Appl. No.: 12/428,433

(22) Filed: Apr. 22, 2009

(65) Prior Publication Data

US 2009/0298590 A1 Dec. 3, 2009

Related U.S. Application Data

(63) Continuation of application No. 11/588,779, filed on Oct. 26, 2006, now Pat. No. 8,062,126, and a
(Continued)

(51) Int. Cl.
*G06F 3/0346* (2013.01)
*A63F 13/245* (2014.01)
(Continued)

(52) U.S. Cl.
CPC ............. *A63F 13/245* (2014.09); *A63F 13/02* (2013.01); *A63F 13/06* (2013.01); *A63F 13/23* (2014.09);
(Continued)

(58) Field of Classification Search
CPC ............................................. A63F 2300/1093
(Continued)

(56) References Cited

U.S. PATENT DOCUMENTS

| 3,943,277 A | 3/1976 | Everly et al. ................. 348/169 |
| 4,263,504 A | 4/1981 | Thomas ......................... 235/454 |

(Continued)

FOREIGN PATENT DOCUMENTS

| EP | 0353200 | 1/1990 | ............ G01S 17/10 |
| EP | 0652686 | 5/1995 | ............... H04R 1/40 |

(Continued)

OTHER PUBLICATIONS

Bolt, R.A., "Put-that-there": voice and gesture at the graphics interface, Computer Graphics, vol. 14, No. 3 (ACM SIGGRAPH Conference Proceedings) Jul. 1980, pp. 262-270.
(Continued)

*Primary Examiner* — David L Lewis
*Assistant Examiner* — Ross Williams
(74) *Attorney, Agent, or Firm* — Martine Penilla Group, LLP

(57) ABSTRACT

Apparatus, methods and systems for interfacing a controller with a gaming system to interact with a computer program rendering interactive content on a display are presented. In one embodiment, a controller includes a handle, a connector and an attachment. The handle has an elongated shape, which includes opposite first and second ends, and is configured to be held by a single hand of a user during operation. The handle's second end, aimed towards the display during operation, holds the connector. The attachment includes two interfaces: a visual interface for communication with the gaming system, and a connector interface that is coupled to the connector in the handle. The attachment can be coupled and decoupled to the connector and allows the gaming system to visually track the location of the handle via the visual interface. In another embodiment, the attachment provides additional communication capabilities.

20 Claims, 21 Drawing Sheets

Related U.S. Application Data continuation of application No. 12/259,181, filed on Oct. 27, 2008.

(60) Provisional application No. 61/057,783, filed on May 30, 2008, provisional application No. 61/120,340, filed on Dec. 5, 2008, provisional application No. 61/200,973, filed on Dec. 5, 2008, provisional application No. 60/730,659, filed on Oct. 26, 2005.

(51) Int. Cl.
| | |
|---|---|
| A63F 13/23 | (2014.01) |
| A63F 13/98 | (2014.01) |
| A63F 13/20 | (2014.01) |
| A63F 13/213 | (2014.01) |

(52) U.S. Cl.
CPC ...... A63F 13/213 (2014.09); A63F 2300/1006 (2013.01); A63F 2300/1031 (2013.01); A63F 2300/1081 (2013.01); A63F 2300/1087 (2013.01)

(58) Field of Classification Search
USPC .................. 463/1–6, 34–39, 44–46
See application file for complete search history.

(56) References Cited

U.S. PATENT DOCUMENTS

| | | | |
|---|---|---|---|
| 4,313,227 A | 1/1982 | Eder | 398/106 |
| 4,558,864 A | 12/1985 | Medwedeff | 273/148 B |
| 4,565,999 A | 1/1986 | King et al. | 345/15 B |
| 4,787,051 A | 11/1988 | Olson | 364/518 |
| 4,802,227 A | 1/1989 | Elko et al. | 381/92 |
| 4,823,001 A | 4/1989 | Kobayashi et al. | 356/616 |
| 4,843,568 A | 6/1989 | Krueger et al. | 364/518 |
| 5,034,986 A | 7/1991 | Karmann et al. | 382/103 |
| 5,055,840 A | 10/1991 | Bartlett | 341/31 |
| 5,111,401 A | 5/1992 | Everett et al. | 701/24 |
| 5,128,671 A | 7/1992 | Thomas, Jr. | 341/20 |
| 5,144,594 A | 9/1992 | Gilchrist | 367/129 |
| 5,260,556 A | 11/1993 | Lake et al. | 235/494 |
| 5,297,061 A | 3/1994 | Dementhon et al. | 345/180 |
| 5,317,140 A | 5/1994 | Dunthorn | |
| 5,335,011 A | 8/1994 | Addeo et al. | 348/15 |
| 5,394,168 A | 2/1995 | Smith, III et al. | 345/156 |
| 5,426,450 A | 6/1995 | Drumm | 345/168 |
| 5,455,685 A | 10/1995 | Mori | 348/363 |
| 5,473,701 A | 12/1995 | Cezanne et al. | 381/92 |
| 5,485,273 A | 1/1996 | Mark et al. | 356/350 |
| 5,528,265 A | 6/1996 | Harrison | 345/158 |
| 5,534,917 A | 7/1996 | MacDougall | 348/169 |
| 5,543,818 A | 8/1996 | Scott | 345/168 |
| 5,557,684 A | 9/1996 | Wang et al. | 382/107 |
| 5,563,988 A | 10/1996 | Maes et al. | 345/421 |
| 5,568,928 A | 10/1996 | Munson et al. | 463/37 |
| 5,581,276 A | 12/1996 | Cipolla et al. | 345/156 |
| 5,583,478 A | 12/1996 | Renzi | 340/407.1 |
| 5,586,231 A | 12/1996 | Florent et al. | 345/472 |
| 5,611,731 A | 3/1997 | Bouton et al. | 463/37 |
| 5,616,078 A | 4/1997 | Oh | 463/8 |
| 5,638,228 A | 6/1997 | Thomas, III | 360/60 |
| 5,649,021 A | 7/1997 | Matey et al. | 382/128 |
| 5,675,825 A | 10/1997 | Dreyer et al. | 395/800 |
| 5,675,828 A | 10/1997 | Stoel et al. | 395/157 |
| 5,677,710 A | 10/1997 | Thompson-Rohrlich | 345/173 |
| 5,706,364 A | 1/1998 | Kopec et al. | 382/159 |
| 5,768,415 A | 6/1998 | Jagadish et al. | 382/154 |
| 5,796,354 A | 8/1998 | Cartabiano et al. | 341/22 |
| 5,818,424 A | 10/1998 | Korth | 345/158 |
| 5,846,086 A | 12/1998 | Bizzi et al. | 434/247 |
| 5,850,222 A | 12/1998 | Cone | 345/418 |
| 5,850,473 A | 12/1998 | Andersson | 382/165 |
| 5,861,910 A | 1/1999 | McGarry et al. | 348/87 |
| 5,870,100 A | 2/1999 | DeFreitas | 345/441 |
| 5,883,616 A | 3/1999 | Koizumi et al. | 345/156 |
| 5,889,505 A | 3/1999 | Toyama et al. | 345/156 |
| 5,889,672 A | 3/1999 | Schuler et al. | 700/83 |
| 5,900,863 A | 5/1999 | Numazaki | 345/158 |
| 5,913,727 A | 6/1999 | Ahdoot | 463/39 |
| 5,914,723 A | 6/1999 | Gajewska | 345/597 |
| 5,917,493 A | 6/1999 | Tan et al. | 715/835 |
| 5,923,306 A | 7/1999 | Smith et al. | 345/2 |
| 5,923,318 A | 7/1999 | Zhai et al. | 345/157 |
| 5,929,444 A | 7/1999 | Leichner | 250/341.7 |
| 5,930,383 A | 7/1999 | Netaer | 382/154 |
| 5,930,741 A | 7/1999 | Kramer | 702/153 |
| 5,937,081 A | 8/1999 | O'Brill et al. | 382/111 |
| 5,959,596 A | 9/1999 | McCarten et al. | 345/2 |
| 5,963,250 A | 10/1999 | Parker et al. | 348/211.6 |
| 5,993,314 A | 11/1999 | Dannenberg et al. | 461/1 |
| 6,009,210 A | 12/1999 | Kang | 382/276 |
| 6,021,219 A | 2/2000 | Andersson et al. | 382/190 |
| 6,031,545 A | 2/2000 | Ellenby et al. | 345/435 |
| 6,031,934 A | 2/2000 | Ahmad et al. | 382/154 |
| 6,037,942 A | 3/2000 | Millington | 715/835 |
| 6,044,181 A | 3/2000 | Szeliski et al. | 382/284 |
| 6,049,619 A | 4/2000 | Anandan et al. | 382/107 |
| 6,056,640 A | 5/2000 | Schaaij | 463/4 |
| 6,057,909 A | 5/2000 | Yahav et al. | 356/5.04 |
| 6,061,055 A | 5/2000 | Marks | 382/276 |
| 6,075,895 A | 6/2000 | Qiao et al. | 382/218 |
| 6,078,789 A | 6/2000 | Bodenmann et al. | 455/66 |
| 6,091,905 A | 7/2000 | Yahav et al. | 396/106 |
| 6,094,625 A | 7/2000 | Ralston | 702/150 |
| 6,097,369 A | 8/2000 | Wambach | 345/158 |
| 6,100,517 A | 8/2000 | Yahav et al. | 250/208.1 |
| 6,100,895 A | 8/2000 | Miura et al. | 345/426 |
| 6,101,289 A | 8/2000 | Kellner | 382/276 |
| 6,115,052 A | 9/2000 | Freeman et al. | 345/473 |
| 6,134,346 A | 10/2000 | Berman et al. | 382/163 |
| 6,144,367 A | 11/2000 | Berstis | 345/158 |
| 6,151,009 A | 11/2000 | Kanade et al. | 345/641 |
| 6,157,368 A | 12/2000 | Faeger | 345/156 |
| 6,160,540 A | 12/2000 | Fishkin et al. | 345/184 |
| 6,166,744 A | 12/2000 | Jaszlics et al. | 345/435 |
| 6,173,059 B1 | 1/2001 | Huang et al. | 381/92 |
| 6,175,343 B1 | 1/2001 | Mitchell et al. | 345/8 |
| 6,184,863 B1 | 2/2001 | Sibert et al. | 345/156 |
| 6,191,773 B1 | 2/2001 | Maruno et al. | 345/158 |
| 6,195,104 B1 | 2/2001 | Lyons | 345/473 |
| 6,215,898 B1 | 4/2001 | Woodfill et al. | 382/154 |
| 6,243,491 B1 | 6/2001 | Andersson | 382/165 |
| 6,275,213 B1 | 8/2001 | Tremblay et al. | 345/156 |
| 6,281,930 B1 | 8/2001 | Parker et al. | 348/211.9 |
| 6,282,362 B1 | 8/2001 | Murphy et al. | 386/46 |
| 6,295,064 B1 | 9/2001 | Yamaguchi | 345/419 |
| 6,297,838 B1 | 10/2001 | Chang et al. | 715/863 |
| 6,304,267 B1 | 10/2001 | Sata | 345/427 |
| 6,307,549 B1 | 10/2001 | King et al. | 715/810 |
| 6,307,568 B1 | 10/2001 | Rom | 345/629 |
| 6,323,839 B1 | 11/2001 | Fukuda et al. | 345/157 |
| 6,323,942 B1 | 11/2001 | Bamji | 356/5.01 |
| 6,326,901 B1 | 12/2001 | Gonzales | 340/7.2 |
| 6,327,073 B1 | 12/2001 | Yahav et al. | 359/321 |
| 6,331,911 B1 | 12/2001 | Manassen et al. | 359/260 |
| 6,342,010 B1 * | 1/2002 | Slifer | 463/39 |
| 6,346,929 B1 | 2/2002 | Fukushima et al. | 354/8 |
| 6,351,661 B1 | 2/2002 | Cosman | 600/426 |
| 6,371,849 B1 | 4/2002 | Togami | 463/4 |
| 6,375,572 B1 | 4/2002 | Masuyama et al. | 463/43 |
| 6,392,644 B1 | 5/2002 | Miyata et al. | 345/419 |
| 6,394,897 B1 | 5/2002 | Togami | 463/4 |
| 6,400,374 B2 | 6/2002 | Lanier | 345/630 |
| 6,409,602 B1 | 6/2002 | Wiltshire et al. | 463/42 |
| 6,411,392 B1 | 6/2002 | Bender et al. | 358/1.14 |
| 6,411,744 B1 | 6/2002 | Edwards | 382/294 |
| 6,417,836 B1 | 7/2002 | Kumar et al. | 345/156 |
| 6,441,825 B1 | 8/2002 | Peters | 345/473 |
| 6,473,516 B1 | 10/2002 | Kawaguchi et al. | 382/100 |
| 6,498,860 B1 | 12/2002 | Sasaki et al. | 382/103 |
| 6,504,535 B1 | 1/2003 | Edmark | 345/419 |
| 6,516,466 B1 | 2/2003 | Jackson | 725/62 |
| 6,533,420 B1 | 3/2003 | Eichenlaub | 353/7 |

(56) References Cited

U.S. PATENT DOCUMENTS

| | | | |
|---|---|---|---|
| 6,542,927 B2 | 4/2003 | Rhoads | 709/217 |
| 6,545,706 B1 | 4/2003 | Edwards et al. | 348/169 |
| 6,546,153 B1 | 4/2003 | Hoydal | 382/285 |
| 6,556,704 B1 | 4/2003 | Chen | 382/154 |
| 6,577,748 B2 | 6/2003 | Chang | 382/100 |
| 6,580,414 B1 | 6/2003 | Wergen et al. | 345/156 |
| 6,580,415 B1 | 6/2003 | Kato et al. | 345/156 |
| 6,587,573 B1 | 7/2003 | Stam et al. | 382/104 |
| 6,593,956 B1 | 7/2003 | Potts et al. | 348/14.09 |
| 6,621,938 B1 | 9/2003 | Tanaka et al. | 382/276 |
| 6,628,265 B2 | 9/2003 | Hwang | 345/156 |
| 6,661,914 B2 | 12/2003 | Dufour | 382/154 |
| 6,674,415 B2 | 1/2004 | Nakamura et al. | 345/156 |
| 6,676,522 B2 | 1/2004 | Rowe et al. | 463/42 |
| 6,677,967 B2 | 1/2004 | Swano et al. | 715/839 |
| 6,677,987 B1 | 1/2004 | Girod | 348/171 |
| 6,709,108 B1 | 3/2004 | Levine et al. | 351/211 |
| 6,720,949 B1 | 4/2004 | Pryor et al. | 345/158 |
| 6,727,988 B2 | 4/2004 | Kim et al. | 356/319 |
| 6,741,741 B2 | 5/2004 | Farrell | 382/199 |
| 6,746,124 B2 | 6/2004 | Fischer et al. | 353/43 |
| 6,751,338 B1 | 6/2004 | Wallack | 382/106 |
| 6,753,849 B1 | 6/2004 | Curran et al. | 345/158 |
| 6,767,282 B2 | 7/2004 | Matsuyama et al. | 463/3 |
| 6,769,769 B2 | 8/2004 | Podlleanu et al. | 351/221 |
| 6,772,057 B2 | 8/2004 | Breed et al. | 701/45 |
| 6,774,939 B1 | 8/2004 | Peng | 348/231.4 |
| 6,785,329 B1 | 8/2004 | Pan et al. | 375/240.08 |
| 6,789,967 B1 | 9/2004 | Forester | 400/489 |
| 6,791,531 B1 | 9/2004 | Johnston et al. | 345/157 |
| 6,795,068 B1 | 9/2004 | Marks | 345/419 |
| 6,809,776 B1 | 10/2004 | Simpson | 348/565 |
| 6,819,318 B1 | 11/2004 | Geng | 345/420 |
| 6,847,311 B2 | 1/2005 | Li | 341/28 |
| 6,863,609 B2 | 3/2005 | Okuda et al. | 463/36 |
| 6,881,147 B2 | 4/2005 | Naghi et al. | 463/35 |
| 6,884,171 B2 | 4/2005 | Eck et al. | 463/42 |
| 6,890,262 B2 | 5/2005 | Oishi et al. | 463/31 |
| 6,917,688 B2 | 7/2005 | Yu et al. | 381/94.7 |
| 6,919,824 B2 | 7/2005 | Lee | 341/20 |
| 6,924,787 B2 | 8/2005 | Kramer et al. | 345/156 |
| 6,928,180 B2 | 8/2005 | Stam et al. | 382/104 |
| 6,930,725 B1 | 8/2005 | Hayashi | 348/373 |
| 6,931,596 B2 | 8/2005 | Gutta et al. | 715/728 |
| 6,943,776 B2 | 9/2005 | Ehrenburg | 345/168 |
| 6,945,653 B2 | 9/2005 | Kobori et al. | 353/30 |
| 6,951,515 B2 | 10/2005 | Ohshima et al. | 463/31 |
| 6,952,198 B2 | 10/2005 | Hansen | 345/158 |
| 6,965,362 B1 | 11/2005 | Ishizuka | 345/82 |
| 6,970,183 B1 | 11/2005 | Monroe | 348/143 |
| 6,990,639 B2 | 1/2006 | Wilson | 715/863 |
| 7,006,009 B2 | 2/2006 | Newman | 340/854.5 |
| 7,016,411 B2 | 3/2006 | Azuma et al. | 375/240.08 |
| 7,039,199 B2 | 5/2006 | Rui | 381/92 |
| 7,039,253 B2 | 5/2006 | Matsuoka et al. | 382/295 |
| 7,042,440 B2 | 5/2006 | Pryor et al. | 345/158 |
| 7,043,056 B2 | 5/2006 | Edwards et al. | 382/103 |
| 7,054,452 B2 | 5/2006 | Ukita | 381/92 |
| 7,059,962 B2 | 6/2006 | Watashiba | 463/2 |
| 7,061,507 B1 | 6/2006 | Tuomi et al. | 345/611 |
| 7,071,914 B1 | 7/2006 | Marks | 345/156 |
| 7,090,352 B2 | 8/2006 | Kobor et al. | 353/30 |
| 7,098,891 B1 | 8/2006 | Pryor | 345/158 |
| 7,102,615 B2 | 9/2006 | Marks | 345/156 |
| 7,106,366 B2 | 9/2006 | Parker et al. | 348/222.1 |
| 7,116,330 B2 | 10/2006 | Marshall et al. | 345/474 |
| 7,116,342 B2 | 10/2006 | Dengler et al. | 345/630 |
| 7,121,946 B2 | 10/2006 | Paul et al. | 463/36 |
| 7,139,767 B1 | 11/2006 | Taylor et al. | 707/102 |
| 7,148,922 B2 | 12/2006 | Shimada | 348/370 |
| 7,164,413 B2 | 1/2007 | Davis et al. | 345/163 |
| 7,183,929 B1 | 2/2007 | Antebi et al. | 340/573.1 |
| 7,212,308 B2 | 5/2007 | Morgan | 358/1.18 |
| 7,223,173 B2 | 5/2007 | Masuyama et al. | 463/36 |
| 7,224,384 B1 | 5/2007 | Iddan et al. | 348/207.99 |
| 7,227,526 B2 | 6/2007 | Hildreth et al. | 345/156 |
| 7,227,976 B1 | 6/2007 | Jung et al. | 382/103 |
| 7,245,273 B2 | 7/2007 | Eberl et al. | 351/211 |
| 7,259,375 B2 | 8/2007 | Tichit et al. | 250/341.8 |
| 7,263,462 B2 | 8/2007 | Funge et al. | 702/179 |
| 7,274,305 B1 | 9/2007 | Lutrell | 340/870.02 |
| 7,283,679 B2 | 10/2007 | Okada et al. | 382/260 |
| 7,296,007 B1 | 11/2007 | Funge et al. | 706/47 |
| 7,301,530 B2 | 11/2007 | Lee et al. | 345/158 |
| 7,305,114 B2 | 12/2007 | Wolff et al. | 709/200 |
| 7,331,856 B1 * | 2/2008 | Nakamura et al. | 463/7 |
| 7,346,387 B1 | 3/2008 | Wachter et al. | 600/476 |
| 7,352,359 B2 | 4/2008 | Zalewski et al. | 345/156 |
| 7,364,297 B2 | 4/2008 | Goldfain et al. | 351/206 |
| 7,379,559 B2 | 5/2008 | Wallace et al. | 382/100 |
| 7,391,409 B2 | 6/2008 | Zalewski et al. | 345/156 |
| 7,436,887 B2 | 10/2008 | Yeredor et al. | 375/240 |
| 7,445,550 B2 * | 11/2008 | Barney | A63F 13/235 446/175 |
| 7,446,650 B2 | 11/2008 | Schofield et al. | 340/425.5 |
| 7,545,926 B2 | 6/2009 | Mao | 379/406.08 |
| 7,558,698 B2 | 7/2009 | Funge et al. | 702/179 |
| 7,613,610 B1 | 11/2009 | Zimmerman et al. | 704/235 |
| 7,623,115 B2 | 11/2009 | Marks | 345/156 |
| 7,627,139 B2 | 12/2009 | Marks et al. | 382/103 |
| 7,636,645 B1 | 12/2009 | Yen et al. | 702/152 |
| 7,636,697 B1 | 12/2009 | Dobson et al. | 706/12 |
| 7,636,701 B2 | 12/2009 | Funge et al. | 706/47 |
| 7,697,700 B2 | 4/2010 | Mao | 381/94.3 |
| 7,721,231 B2 | 5/2010 | Wilson | 715/863 |
| 2001/0056477 A1 | 12/2001 | McTernan et al. | 709/219 |
| 2002/0010655 A1 | 1/2002 | Kjallstrom | 705/27 |
| 2002/0056114 A1 | 5/2002 | Fillebrown et al. | 725/78 |
| 2002/0065121 A1 * | 5/2002 | Fukunaga et al. | 463/8 |
| 2002/0072414 A1 | 6/2002 | Stylinski et al. | 463/42 |
| 2002/0075286 A1 | 6/2002 | Yonezawa et al. | 345/679 |
| 2002/0083461 A1 | 6/2002 | Hutcheson et al. | 725/62 |
| 2002/0085097 A1 | 7/2002 | Colmenarez et al. | 348/211 |
| 2002/0094189 A1 | 7/2002 | Navab et al. | 386/4 |
| 2002/0103025 A1 | 8/2002 | Murzanski et al. | |
| 2002/0126899 A1 | 9/2002 | Farrell | 382/199 |
| 2002/0134151 A1 | 9/2002 | Naruoka et al. | 73/291 |
| 2002/0158873 A1 | 10/2002 | Williamson | 345/427 |
| 2003/0014212 A1 | 1/2003 | Ralston et al. | 702/150 |
| 2003/0022716 A1 | 1/2003 | Park et al. | 463/36 |
| 2003/0093591 A1 | 5/2003 | Hohl | 710/22 |
| 2003/0100363 A1 | 5/2003 | Ali | 436/30 |
| 2003/0160862 A1 | 8/2003 | Charlier et al. | 348/14.08 |
| 2003/0232649 A1 | 12/2003 | Gizis et al. | 463/40 |
| 2004/0001082 A1 | 1/2004 | Said | 345/730 |
| 2004/0017355 A1 | 1/2004 | Shim | 345/157 |
| 2004/0063480 A1 | 4/2004 | Wang | 463/8 |
| 2004/0063481 A1 | 4/2004 | Wang | 463/8 |
| 2004/0070565 A1 | 4/2004 | Nayar et al. | 345/156 |
| 2004/0087366 A1 | 5/2004 | Shum et al. | 463/36 |
| 2004/0095327 A1 | 5/2004 | Lo | 345/169 |
| 2004/0140955 A1 | 7/2004 | Metz | 345/166 |
| 2004/0150728 A1 | 8/2004 | Ogino | 348/239 |
| 2004/0178576 A1 | 9/2004 | Hillis et al. | 273/148 |
| 2004/0207597 A1 | 10/2004 | Marks | |
| 2004/0212589 A1 | 10/2004 | Hall et al. | 345/156 |
| 2004/0213419 A1 | 10/2004 | Varma et al. | 381/92 |
| 2004/0227725 A1 | 11/2004 | Calarco et al. | 345/156 |
| 2004/0254017 A1 | 12/2004 | Cheng | 463/35 |
| 2005/0009605 A1 | 1/2005 | Rosenberg et al. | |
| 2005/0037844 A1 | 2/2005 | Shum et al. | 463/36 |
| 2005/0047611 A1 | 3/2005 | Mao | 381/94.7 |
| 2005/0088369 A1 | 4/2005 | Yoshioka | 345/60 |
| 2005/0102374 A1 | 5/2005 | Moragne et al. | 709/217 |
| 2005/0105777 A1 | 5/2005 | Koslowski et al. | 382/115 |
| 2005/0117045 A1 | 6/2005 | Abdellatif et al. | 384/335 |
| 2005/0130743 A1 | 6/2005 | Leifer | |
| 2005/0156903 A1 * | 7/2005 | Kawell et al. | 345/173 |
| 2005/0198095 A1 | 9/2005 | Du et al. | 709/200 |
| 2005/0226431 A1 | 10/2005 | Mao | 381/61 |
| 2005/0239548 A1 | 10/2005 | Ueshima et al. | 463/36 |
| 2006/0033713 A1 | 2/2006 | Pryor | 345/158 |
| 2006/0035710 A1 | 2/2006 | Festejo et al. | 463/36 |
| 2006/0038819 A1 | 2/2006 | Festejo et al. | 345/530 |

(56) References Cited

U.S. PATENT DOCUMENTS

| | | | |
|---|---|---|---|
| 2006/0084504 A1 | 4/2006 | Chan et al. | |
| 2006/0204012 A1 | 9/2006 | Marks et al. | 381/26 |
| 2006/0233389 A1 | 10/2006 | Mao et al. | 381/92 |
| 2006/0252541 A1 | 11/2006 | Zalewski et al. | 463/156 |
| 2006/0256081 A1 | 11/2006 | Zalewski et al. | 345/156 |
| 2006/0264258 A1 | 11/2006 | Zalewski et al. | 463/36 |
| 2006/0264259 A1 | 11/2006 | Zalewski et al. | 463/36 |
| 2006/0264260 A1 | 11/2006 | Zalewski et al. | 463/36 |
| 2006/0269072 A1 | 11/2006 | Mao | 381/56 |
| 2006/0269073 A1 | 11/2006 | Mao | 381/56 |
| 2006/0274032 A1 | 12/2006 | Mao et al. | 345/156 |
| 2006/0274911 A1 | 12/2006 | Mao et al. | 381/334 |
| 2006/0277571 A1 | 12/2006 | Marks et al. | 725/37 |
| 2006/0280312 A1 | 12/2006 | Mao | 381/56 |
| 2006/0282873 A1 | 12/2006 | Zalewski et al. | 725/133 |
| 2006/0287084 A1 | 12/2006 | Mao et al. | 463/37 |
| 2006/0287085 A1 | 12/2006 | Mao et al. | 463/37 |
| 2006/0287086 A1 | 12/2006 | Zalewski et al. | 436/37 |
| 2006/0287087 A1 | 12/2006 | Zalewski et al. | 463/37 |
| 2007/0015559 A1 | 1/2007 | Zalewski et al. | 463/1 |
| 2007/0021208 A1 | 1/2007 | Mao et al. | 463/36 |
| 2007/0025562 A1 | 2/2007 | Zalewski et al. | 381/92 |
| 2007/0060336 A1 | 3/2007 | Marks et al. | 463/30 |
| 2007/0061413 A1 | 3/2007 | Larsen et al. | 709/217 |
| 2007/0066394 A1 | 3/2007 | Ikeda et al. | 463/37 |
| 2007/0072675 A1 | 3/2007 | Hammano et al. | 463/42 |
| 2007/0072680 A1* | 3/2007 | Ikeda | 463/43 |
| 2007/0117625 A1* | 5/2007 | Marks et al. | 463/30 |
| 2007/0120834 A1 | 5/2007 | Boillot | 354/103 |
| 2007/0120996 A1 | 5/2007 | Boillot | 384/345 |
| 2007/0260340 A1 | 11/2007 | Mao | 700/94 |
| 2007/0260517 A1 | 11/2007 | Zalewski et al. | 705/14 |
| 2007/0261077 A1 | 11/2007 | Zalewski et al. | 725/35 |
| 2008/0056561 A1 | 3/2008 | Sawachi | 382/154 |
| 2008/0070684 A1 | 3/2008 | Haigh-Hutchinson | 463/32 |
| 2008/0091421 A1 | 4/2008 | Gustavsson | 704/233 |
| 2008/0261693 A1 | 10/2008 | Zalewski | 463/31 |
| 2009/0010494 A1 | 1/2009 | Bechtel et al. | 382/104 |
| 2009/0016642 A1 | 1/2009 | Hart | 382/278 |
| 2009/0209343 A1* | 8/2009 | Foxlin et al. | 463/36 |
| 2009/0221368 A1 | 9/2009 | Yen et al. | 463/32 |
| 2009/0221374 A1 | 9/2009 | Yen et al. | 463/42 |
| 2009/0288064 A1 | 11/2009 | Yen et al. | 717/106 |
| 2010/0004896 A1 | 1/2010 | Yen et al. | 702/153 |
| 2010/0137064 A1 | 6/2010 | Shum et al. | 463/36 |

FOREIGN PATENT DOCUMENTS

| | | | | |
|---|---|---|---|---|
| EP | 0750202 | | 12/1996 | G01S 17/00 |
| EP | 0835676 | | 4/1998 | A63F 9/22 |
| EP | 1098686 | | 5/2003 | A63F 13/04 |
| EP | 1435258 | | 7/2004 | A63F 13/04 |
| FR | 2814965 | | 4/2002 | A63H 30/00 |
| GB | 2206716 | | 1/1989 | G06F 7/12 |
| GB | 2206716 | | 11/1989 | G06K 7/12 |
| GB | 2376397 | | 11/2002 | G06F 3/00 |
| GB | 2388418 | | 11/2003 | G06F 3/033 |
| GB | 2388418 | A * | 11/2003 | |
| JP | 01-284897 | | 11/1989 | G10H 1/34 |
| JP | 06-102980 | | 4/1994 | G06F 3/02 |
| JP | 07-311568 | | 11/1995 | G09G 5/02 |
| JP | 9-128141 | | 5/1997 | G06F 3/033 |
| JP | 9-185456 | | 7/1997 | G06F 3/033 |
| JP | 9-265346 | | 10/1997 | G06F 3/03 |
| JP | 9-265346 | | 10/1998 | G06F 3/03 |
| JP | 11-38949 | | 2/1999 | G09G 5/00 |
| JP | 2000-172431 | | 6/2000 | G06F 3/033 |
| JP | 2000259856 | | 9/2000 | G06T 17/00 |
| JP | 2000350859 | | 12/2000 | A63F 13/00 |
| JP | 2001-166676 | | 6/2001 | G09B 9/00 |
| JP | 2002369969 | | 12/2002 | A63F 13/12 |
| JP | 2004-145448 | | 5/2004 | G06T 17/40 |
| JP | 2004145448 | | 5/2004 | G06T 17/40 |
| JP | 2005-046422 | | 2/2005 | A63F 13/06 |
| TW | 200525410 | A | 8/2005 | |
| WO | WO 88/05942 | | 8/1988 | G06F 3/033 |
| WO | WO 98/48571 | | 10/1998 | H04N 5/45 |
| WO | WO 99/35633 | | 7/1999 | |
| WO | WO 99/26198 | | 10/1999 | |
| WO | WO 02/27456 | | 2/2002 | G06F 3/00 |
| WO | WO 03/079179 | | 9/2003 | G06F 3/033 |
| WO | WO 2005/073838 | | 8/2005 | G06F 3/033 |
| WO | WO 2005107911 | | 11/2005 | A63F 13/06 |
| WO | WO 2007095082 | | 8/2007 | |
| WO | WO 2008/056180 | | 5/2008 | G01B 11/02 |

OTHER PUBLICATIONS

DeWitt, Thomas and Edelstein, Phil "Pantomation: A System for Position Tracking", Proceedings of the $2^{nd}$ Symposium on Small Computers in the Arts, Oct. 1982, pp. 61-69.

Ephraim et al. "Speech Enhancement Using a Minimum Mean-Square Error Log-Spectral Amplitude Estimator", 1985, IEEE.

Ephraim et al. "Speech Enhancement Using a Minimum Mean-Square Error Short-Time Spectral Amplitude Estimator", 1984, IEEE.

Richardson et al. "Virtual Network Computing", 1998, IEEE Internet Computing vol. 2.

XP-002453974, "CFS and FS95/98/2000: How to Use the Trim Controls to Keep Your Aircraft Level", Aug. 10, 2007, http://support.microsoft.com/?scid=kb%3Ben-us%3B175195&x=13&y=15.

"The Tracking Cube: A Three-Dimentional Input Device", IBM Technical Disclosure Bulletin, Aug. 1, 1989, pp. 91-95, No. 3B, IBM Corp. New York, U.S.

K. B. Shimoga, et al., "Touch and Force Reflection for Telepresence Surgery", Engineering in Medicine and Biology Opportunities of the IEEEE, Baltimore, MD, USA, Nov. 3, 1994, New York, New York, USA, pp. 1049-1050.

Iddan, et al., "3D Imaging in the Studio (and Elsewhere . . . )", Proceedings of the SPIE, SPIE, Bellingham, VA, US, vol. 4298, Jan. 24, 2001, pp. 48-55, XP008005351.

Jojic, et al., "Tracking Self-Occluding Articulated Objects in Dense Disparity Maps", Computer Vision, 1999, The Proceedings fo the Seventh IEEE International Conference on Kerkyra, Greece Sep. 20-27, 1999, Los Alamitos, CA, US, IEEE Computer Society, US, Sep. 20, 1999, (Sep. 20, 1999), pp. 123-130.

Klinker, et al., "Distributed User Tracking Concepts for Augmented Reality Applications", pp. 37-44, Augmented Reality, 2000, IEEE and ACM Int'l Symposium, Oct. 2000, XP010520308, ISBN: 0-7695-0846-4, Germany.

Nakagawa, et al., "A Collision Detection and Motion Image Synthesis Between a Background Image and a Foreground 3-Dimensional Object", TVRSJ Bol. 4, No. 2, pp. 425-430, 1999, Japan.

Mihara, et al., "A Realtime Vision-Based Interface Using Motion Processor and Applications to Robotics", vol. J84-D-11, No. 9, pp. 2070-2078. Sep. 2001, Japan.

Nakamura, et al., "A Consideration on Reconstructing 3-D Model Using Object Views", 2004-01601-003, pp. 17-21, Kokkaido University, Japan, nakamura@media.eng.holcudai.ac.jp.

Nishida, et al., "A Method of Estimating Human Shapes by Fitting the Standard Human Model to Partial Measured Data", D-II vol. J84-D-II, No. 7, pp. 1310-1318, Jul. 2001.

Wilson & Darrell, "Audio-Video Array Source Localization for Intelligent Environments", 2002 IEEE Dept. of Electrical Eng and Computer Science, MIT, Cambridge, MA 02139.

Fiala, et al., "A Panoramic Video and Acoustic Beamforming Sensor for Videoconferencing", 2004 IEEE, Computational Video Group, National Research Council, Ottawa, Canada K1A 0R6.

Hemmi, et al., "3-D Natural Interactive Interface-Using Marker Tracking from a Single View", Sep. 9, 1991, Systems and Computers in Japan.

Lanier, Jaron, "Virtually there: three-dimensional tele-immersion may eventually bring the world to your desk", Scientific American, ISSN: 0036-8733, Year: 2001.

Richardson et al., "Virtual Network Computing" IEEE Internet Computing, vol. 2, No. 1 Jan./Feb. 1998.

(56) References Cited

OTHER PUBLICATIONS

Fujitsu, "Internet Development of Emulators" Abstract, Mar. 1997, vol. 48, No. 2.
Kanade, et al., "A Stereo Machine for Video-rate Dense Depth Mapping and Its New Application" 1996, CVPR 96, IEEE Computer Society Conference, pp. 196-202 (022).
Gvili, et al., "Depth Keying", SPIE vol. 5006 (2003), 2003 SPIE-IS&T, pp. 564-574 (031).
Taiwan Intellectual Property Office, "Taiwan IPO Search Report (with English translation)" for Taiwan Invention Patent Application No. 098129110, completed Jan. 2, 2013.

* cited by examiner

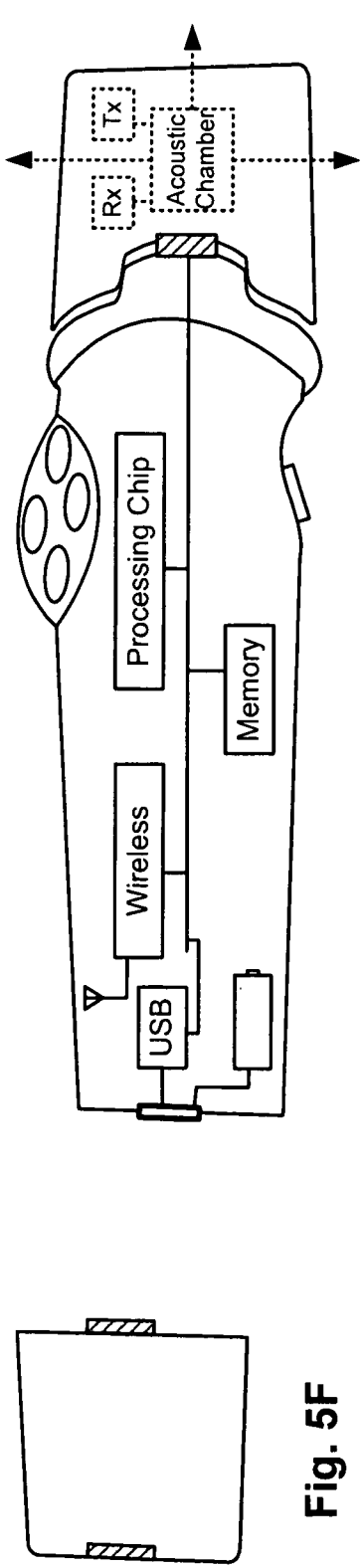
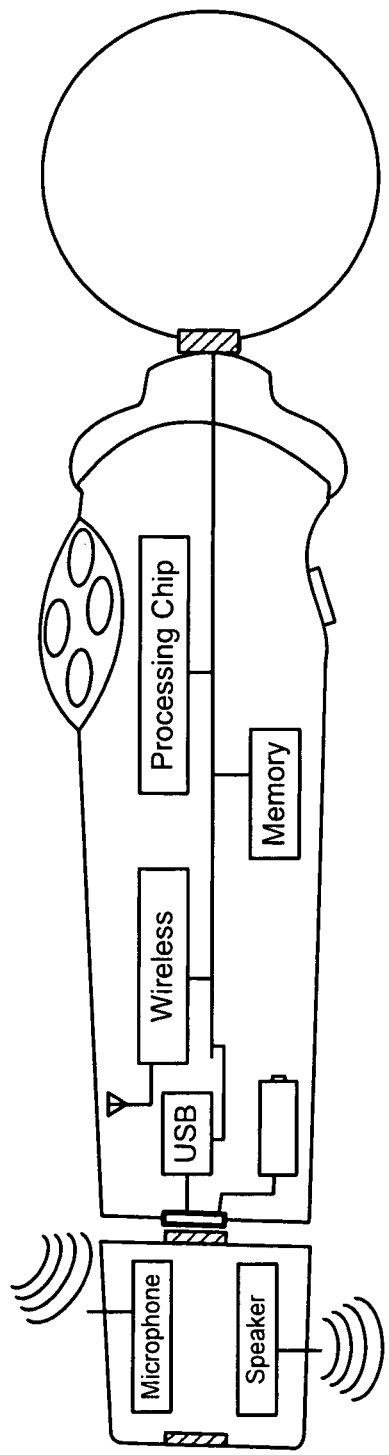
Fig. 5H
Fig. 5G
Fig. 5F

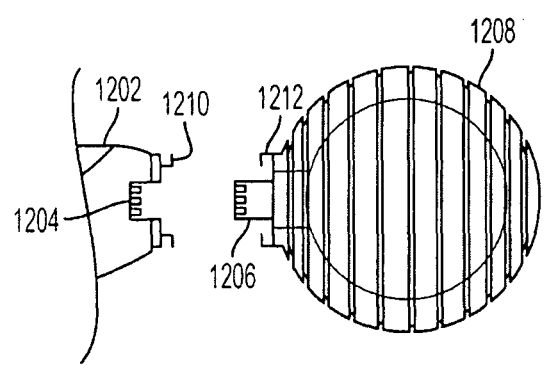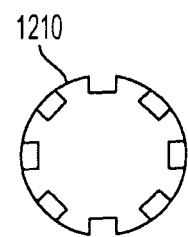
FIG. 12A          FIG. 12B
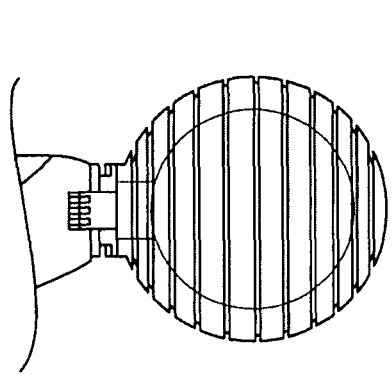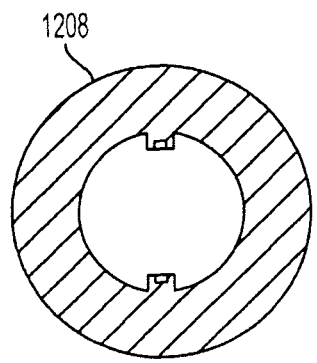
FIG. 12C          FIG. 12D

EXPANDABLE CONTROL DEVICE VIA HARDWARE ATTACHMENT

CLAIM OF PRIORITY

This application is a continuation application of U.S. patent application Ser. No. 11/588,779 (now issued as Pat. No. 8,062,126), filed Oct. 26, 2006 and entitled, "SYSTEM AND METHOD FOR INTERFACING WITH A COMPUTER PROGRAM", which claims priority from U.S. Provisional Patent Application No. 60/730,659, filed Oct. 26, 2005, and entitled "SYSTEM AND METHOD FOR INTERFACING WITH A COMPUTER PROGRAM". This application is a continuation application of U.S. patent application Ser. No. 12/259,181, filed Oct. 27, 2008, and entitled "DETERMINING LOCATION AND MOVEMENT OF BALL-ATTACHED CONTROLLER". This application claims priority from U.S. Provisional Patent Application No. 61/057,783, filed May 30, 2008, and entitled, "DETERMINATION OF CONTROLLER THREE-DIMENSIONAL LOCATION USING IMAGE ANALYSIS AND ULTRASONIC COMMUNICATION"; U.S. Provisional Patent Application No. 61/120,340, filed on Dec. 5, 2008, and entitled "CONTROL DEVICE FOR COMMUNICATING VISUAL INFORMATION"; and U.S. Provisional Patent Application No. 61/200,973, filed on Dec. 5, 2008, and entitled "SPHERICAL ENDED CONTROLLER WITH CONFIGURABLE MODES". All these Patent Applications are incorporated herein by reference.

CROSS REFERENCE TO RELATED APPLICATIONS

This application is related to U.S. patent application Ser. No. 12/145,455, filed Jun. 24, 2008 and entitled, "DETERMINATION OF CONTROLLER THREE-DIMENSIONAL LOCATION USING IMAGE ANALYSIS AND ULTRASONIC COMMUNICATION"; U.S. patent application Ser. No. 11/429,133, filed May 4, 2006, and entitled "SELECTIVE SOUND SOURCE LISTENING IN CONJUNCTION WITH COMPUTER INTERACTIVE PROCESSING"; International Application No: PCT/US2006/017483, filed May 4, 2006, and titled "SELECTIVE SOUND SOURCE LISTENING IN CONJUNCTION WITH COMPUTER INTERACTIVE PROCESSING", all of which are incorporated herein by reference.

BACKGROUND

1. Field of the Invention

The present invention relates generally to methods and systems for expanding input device functionality, and more particularly, methods and systems for improving interaction between a game controller and a gaming base system by expanding the capabilities of the controller.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation®, Sony Playstation2® (PS2), and Sony Playstation3® (PS3), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet.

As game complexity continues to intrigue players, game and hardware manufacturers have continued to innovate to enable additional interactivity and computer programs. A growing trend in the computer gaming industry is to develop games that increase the interaction between user and the gaming system. One way of accomplishing a richer interactive experience is to use wireless game controllers whose movement is tracked by the gaming system in order to track the player's movements and use these movements as inputs for the game. Another way to improve the interactive experience is by providing the user with controllers with better communication capabilities.

However, input device development processes are usually lengthy and adding new features requires large investments in time and research. Further, adding features and complexity to input devices also raises the final cost to the user, which may decrease the number of potential customers. Still yet, some features may be useful for just a small community of players.

It is in this context that embodiments of the invention arise.

SUMMARY

Embodiments of the present invention provide apparatus, methods and systems for interfacing a controller with a gaming system to interact with a computer program rendering interactive content on a display.

It should be appreciated that the present invention can be implemented in numerous ways, such as a process, an apparatus, a system, a device or a method on a computer readable medium. Several inventive embodiments of the present invention are described below.

In one embodiment, a controller includes a handle, a connector and an attachment. The handle has an elongated shape, which includes opposite first end and second ends, and is configured to be held by a single hand of a user during operation. The second end is aimed towards the display during operation. The connector is located at the second end of the handle. The attachment includes two interfaces: a visual interface for communication with the gaming system, and a connector interface that is coupled to the connector in the handle. The attachment can be coupled and decoupled to the connector and allows the gaming system to visually track the location of the handle via the visual interface.

In another embodiment, a handheld controller includes a handle, a connector in the handle and an attachment. The attachment includes a communications interface and a connector interface. The communications interface enables the attachment to exchange information directly with the gaming system, and the connector interface allows the attachment to communicate with the handle. The attachment can be coupled and decoupled to the connector allowing the handle to exchange information with the gaming system and the user via the communications and the connector interfaces.

In yet another embodiment, a method is presented for interfacing a controller with a gaming system to interact with a computer program. The method includes the operation of connecting an attachment to the controller, enabling the controller to receive and send information. The controller receives information from the attachment that was previously sent from the base station to the attachment. The controller sends information to the base station via the attachment. The method further includes the operation of updating a state of the controller when the controller receives information, and the operation of updating a state of the computer program when the controller sends information via the attachment.

In another embodiment, a system for playing games includes a controller, an attachment, an image capture device, and a base gaming system. The controller is designed to be held and operated by a single hand of a user, and the attachment can be connected to and disconnected from the controller. The image capture device takes images of the attachment in the field of play. The base gaming system is connected to the image capture device and interfaces with the attachment when the attachment is connected to the game controller. In the system, a first type of information is provided to the base gaming system and to a user when the attachment is connected to the controller and a second type of information is provided when the attachment is disconnected.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIGS. 5A-H illustrate the internal components of different embodiments for attachments and controllers connected to the attachments.

FIGS. 12A-D illustrate embodiments for connecting the attachment to the controller.

DETAILED DESCRIPTION

The following embodiments describe apparatus, methods and systems for interfacing a controller with a gaming system to interact with a computer program rendering interactive content on a display.

It will be obvious, however, to one skilled in the art, that the present invention may be practiced without some or all of these specific details. In other instances, well known process operations have not been described in detail in order not to unnecessarily obscure the present invention.

Figures 1A, 1B:
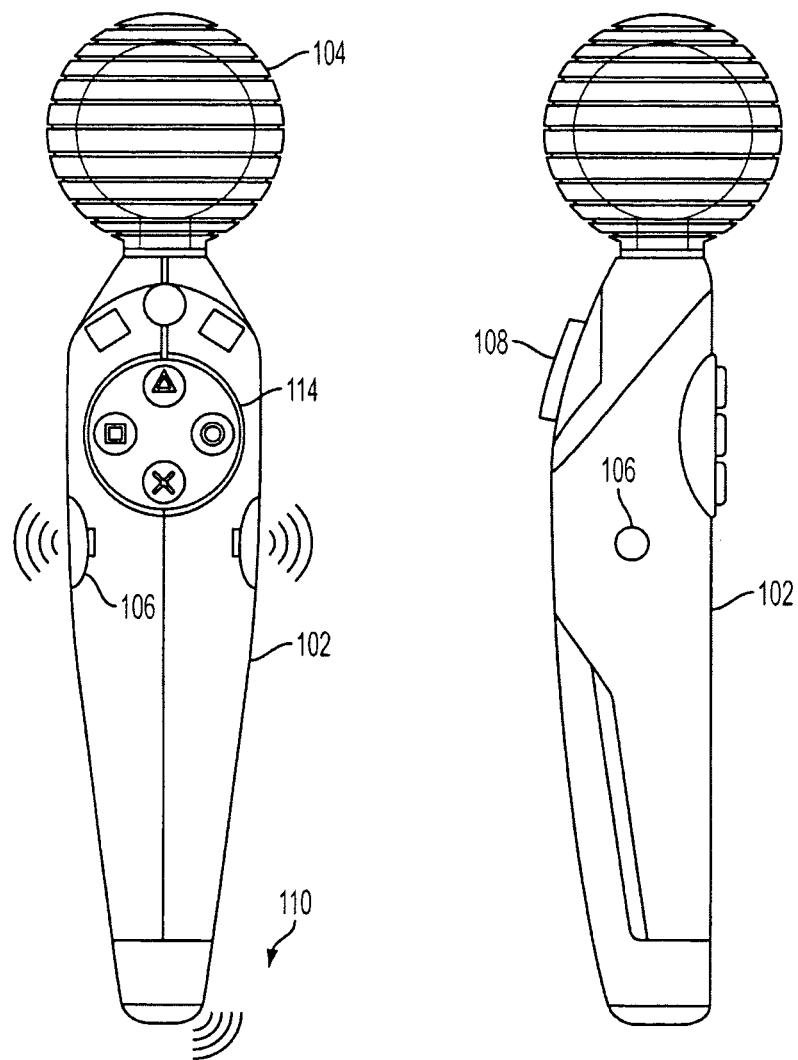
FIGS. 1A-1B depict different embodiments of a game controller with a spherical section attached.

FIGS. 1A-1B depict different embodiments of a game controller with a spherical section attached. FIG. 1A is a front view and FIG. 1B is a side view of controller handle 102 with a spherical section attachment 104 coupled to controller handle 102. When attached, spherical section attachment 104 can be illuminated in different ways, such as with different colors, different brightness, and in intermittent fashion. The visual cues generated by spherical section attachment 104 can be used to provide visual feedback to the user holding the controller, and sometimes provide feedback to other users interacting with the user holding the controller. The visual cues can also provide visual input to the base device via an image capture device that takes images of the area around controller handle 102. In one embodiment, input can be provided via buttons pad 114 on the frontal surface of controller handle 102, or via bottom button 108. Buttons pad 114 can be configured for action buttons or as a directional pad. Bottom button 108 can be used in applications such as firing, picking up an object, turning on or off a flashlight, etc. Speaker 106 generates audio signals, and vibration device 110 provides vibrotactile feedback to the user.

Figure 2D:
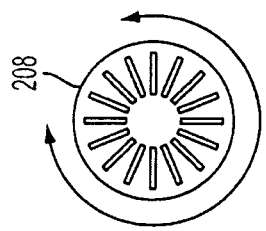
FIGS. 2A-D show an embodiment of a ball-attached game controller with interchangeable face-plates.
Figure 2C:
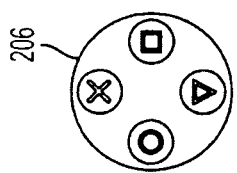
Figure 2B:
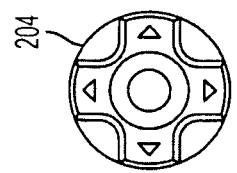
Figure 2A:
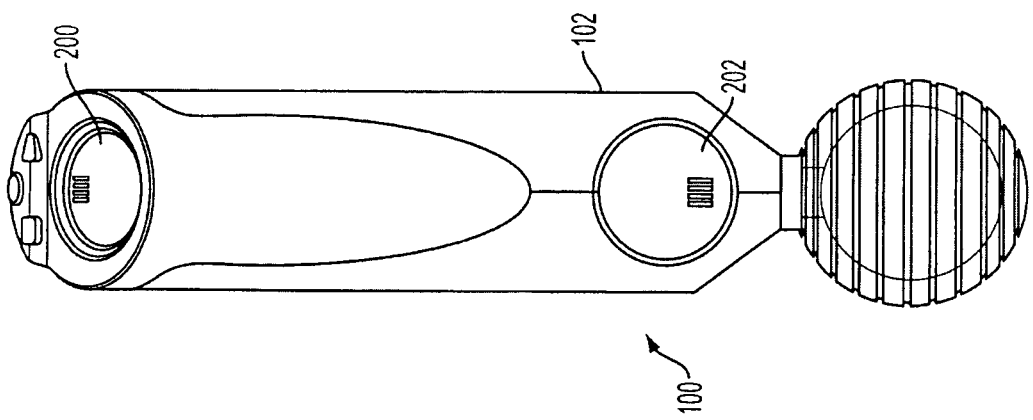

FIGS. 2A-D show an embodiment of a ball-attached game controller with interchangeable face-plates. FIG. 2A shows a controller, similar to the controllers in FIGS. 1A-B, with interchangeable face-plates. The face-plates for FIGS. 2B-2D can be attached to the controller, either at the top or at the side. In another embodiment, the sizes of the face plates are different for the slots on the top and the side, and the face plates for the top are not exchangeable with the face plates for the side. FIGS. 2B-2D show a D-pad attachment, an action-buttons pad, and a touch pad, respectively. The attachments include electrical connections and a mechanical grip that snaps the attachments securely when placed on the controller.

Figure 3:
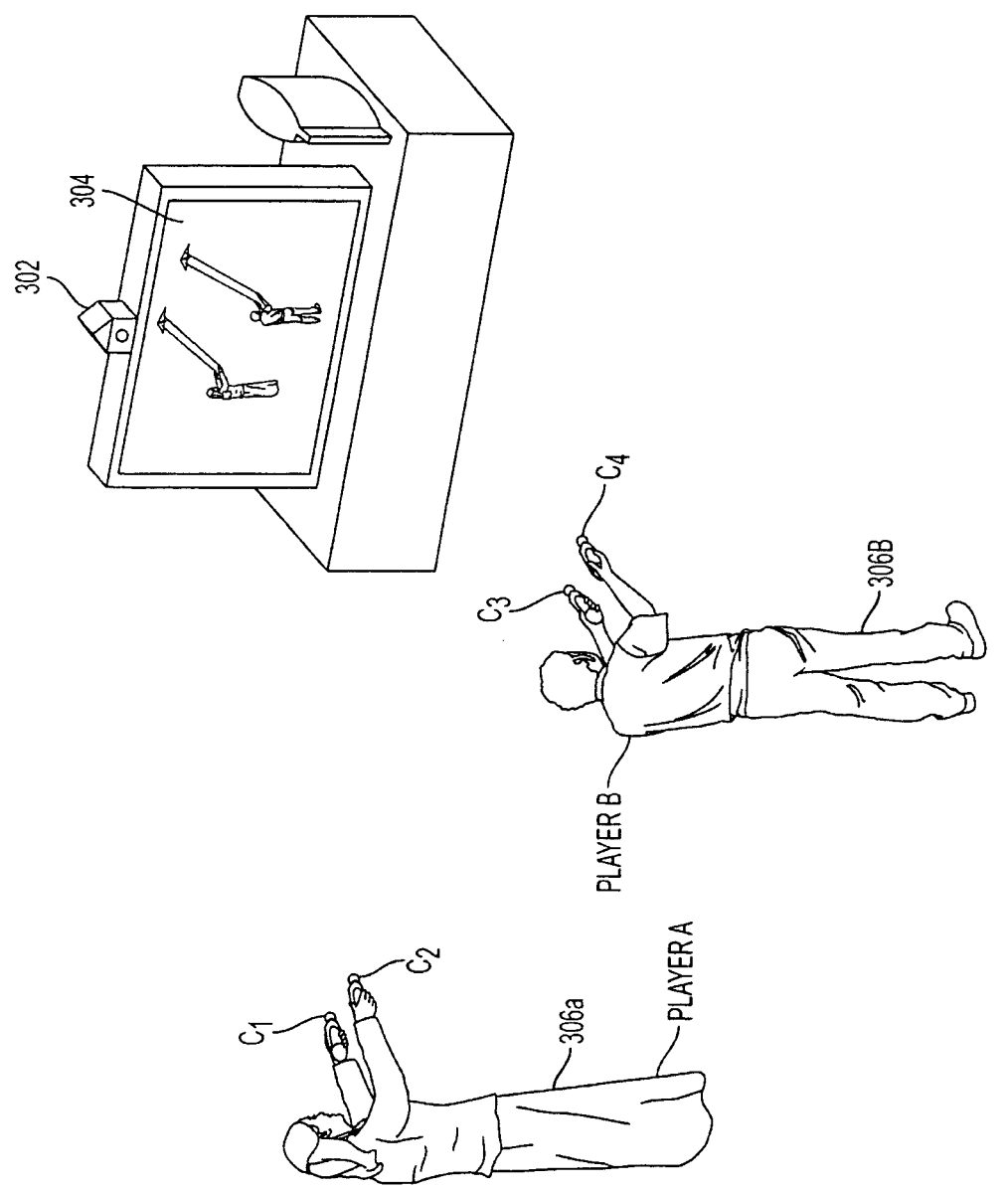
FIG. 3 shows a schematic diagram of a multiplayer environment and the use of visual information to determine the location of the controllers, according to one embodiment.

FIG. 3 shows a schematic diagram of a multiplayer environment and the use of visual information to determine the location of the controllers, according to one embodiment. Image capture device 302 obtains an image of the playing field that includes players A and B 306A-B. The image is analyzed by the base computing device 308, which is connected to image capture device 302, to obtain the location of ball-attached controllers C1, C2, C3 and C4, whose inputs translate into actions of the avatars in the display. Thus, the ball attached to the controller, also referred to herein as a spherical section attachment, and image capture device 302 form a visual interface to communicate location information between the controller and the base gaming system.

In one embodiment, the four controllers include spherical attachments, sometimes referred to as "balls," that can be illuminated with different colors that enable visual controller differentiation. For example, controller C1 lights up as red, C2 as yellow, C3 as white, and C4 as blue. This color selection is exemplary, and many other color combinations are possible. In one embodiment, the movement of the controllers is used for playing a game where players fly virtual kites, but many other applications are possible, such as karate fighting, firing, sword fighting, virtual worlds, etc.

In some embodiments, the light in the controller is used to provide feedback to the user, such as being when the player is "hit," to indicate the amount of life left, to flag when the controller is occluded from view of the camera, etc. The two modes, providing visual input via camera pictures and providing user feedback, can be used simultaneously. In one embodiment, each time the ball is lit to provide user feedback, the base station uses the information associated with lighting the ball in the controller to analyze an image taken by image capture device 302 searching for the color associated with the lighting of the ball. For example, in one mode of operation, when a player pushes a button on the controller then the controller responds by lighting up the ball. The base station monitors the visual status of the ball and when the base station detects that the ball has lighted up, then the base station processes this event to capture that the player pushed the button.

Figure 4:
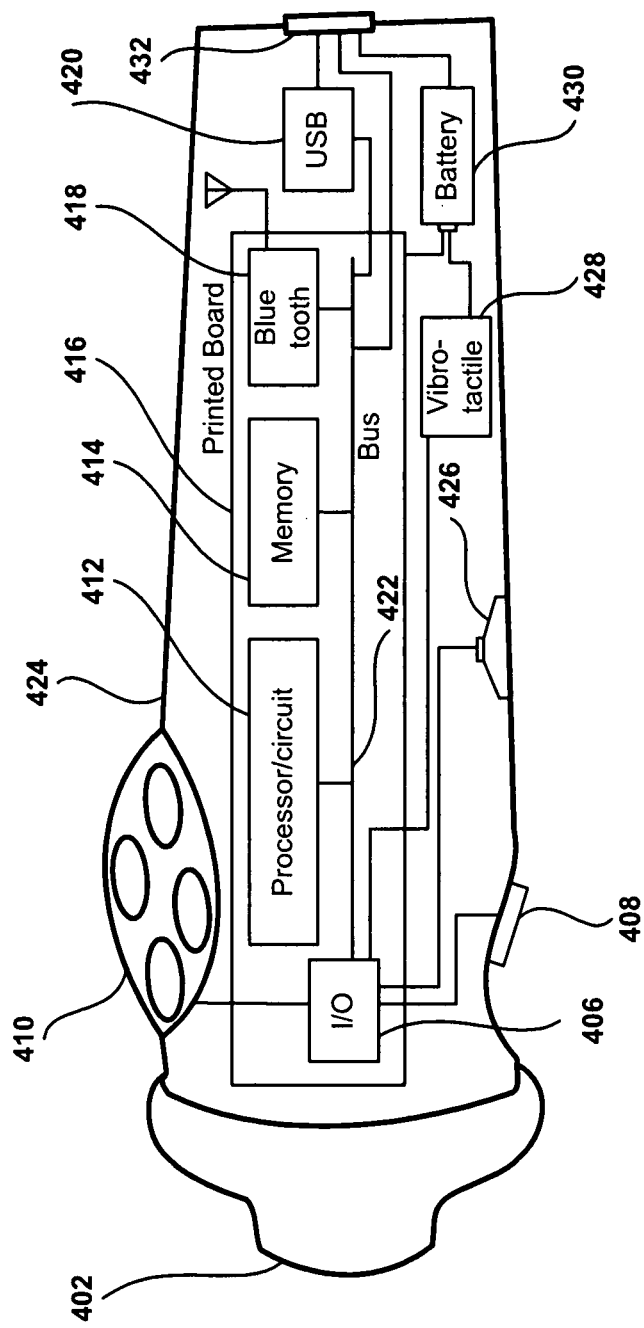
FIG. 4 illustrates the components of one embodiment for a single-hand controller with an expansion connector.

FIG. 4 illustrates the components of one embodiment for single-hand controller 400 with expansion connector 402. Although controllers defined within the spirit and scope of the claims may have more or less components, these exemplary components show example electronics, hardware, firmware, and housing structure to define an operable example. These example components, however, should not limit the claimed inventions, as more or fewer components are possible. Handle 424 is configured to be held by a user operating controller 400 with a single hand. A user's second hand may, of course, be used to hold or select buttons 400 on handle 424. A user holding controller 400 can provide input by pressing buttons, such as top button 410 and bottom button 408. In one embodiment input can also be provided by moving the controller within a three-dimensional space when a visually recognizable attachment is coupled to handle 424, such as the one shown in FIG. 5. Controller 400 is configured to operate wirelessly, which facilitates freedom of controller movement in order to interact with the base station device. Wireless communication can be achieved in multiple ways, such as via Bluetooth® wireless link, WiFi, infrared (not shown) link, etc.

Attachments providing expanded capabilities to handle 402 are connected and disconnected to expansion connector 402. In one embodiment, a spherical attachment enables the base computing device to locate the combination of handle and attachment within a three-dimensional space via visual recognition of images taken by a camera attached to the base device. Other embodiments provide additional communication capabilities to controller 400, such as an attachment that provides ultrasonic communication with the base computing device or with other controllers in the field of play. In yet another embodiment, an attachment provides infrared capabilities to allow the controller to communicate via infrared frequencies with the base station, or to use controller 400 as a remote control for a TV or other electronic equipment. More attachment embodiments are presented below in FIGS. 5-14.

In one embodiment, the attachment communicates directly with the base station and can act upon commands received from the base station, such as turning on an internal light or emitting a sound. In another embodiment, the attachment is directly controlled by handle 424 and the attachment only reacts to commands from handle 424. In yet another embodiment, the attachment can react to commands received from the base station or from the handle.

Inside handle 424, printed circuit board 416 holds processor 412, Input/Output (I/O) module 406, memory 416, and Bluetooth module 418, all interconnected by bus 422. A Universal Serial Bus (USB) module 420 also provides interactivity with the base computing device, or with other devices connected to USB port 432. The USB port can also be used to charge the rechargeable battery 430. Vibrotactile feedback is provided by vibrotactile module 428. Speaker 426 provides audio output.

Note that the above controller configuration is exemplary and many modifications thereto, including eliminating or adding modules, would occur to a person of ordinary skill in the art with access to the present Specification, and is well within the scope of the claimed invention. For example, controller 400 can also include sensors for mechanical tracking of the controller movement.

Figure 5A:
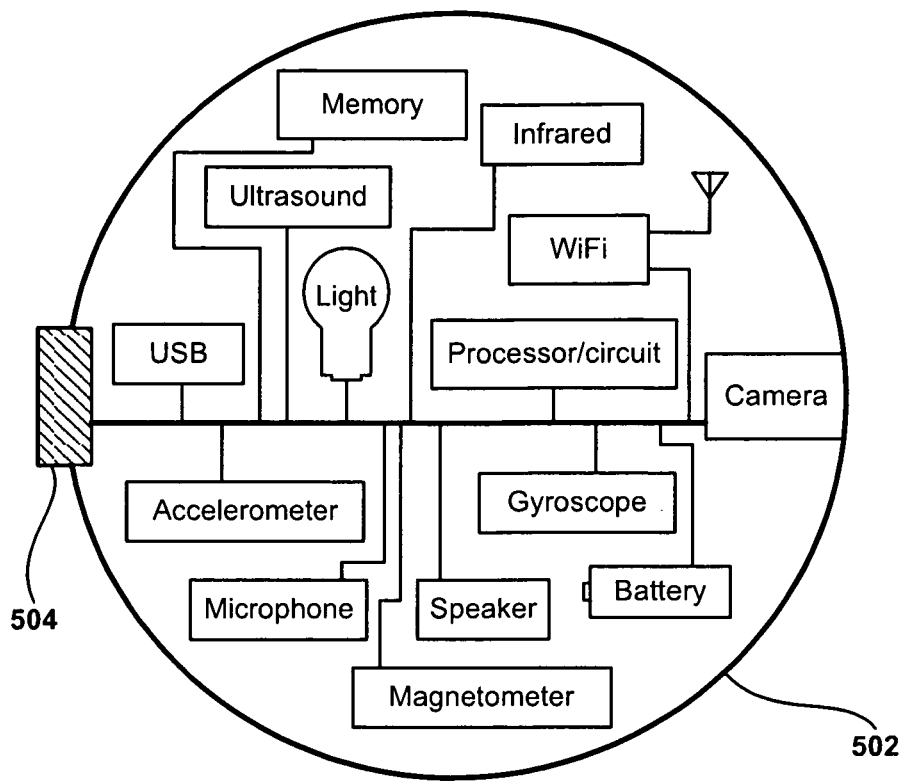

FIGS. 5A-H illustrate the internal components of different embodiments for attachments and controllers connected to the attachments. FIG. 5A depicts a spherical attachment 502 with a "rich" feature set. It should be appreciated that the embodiment illustrated in FIG. 5A is exemplary and other embodiments may include a subset of the features of attachment 502. The embodiment illustrated in FIG. 5A should therefore not be interpreted to be exclusive or limiting, but rather exemplary or illustrative.

Attachment 502 has a spherical shape that allows the visual tracking of the attachment's location. The ability of tracking the location of the attachment by analyzing images captured of the attachment defines a visual interface between the attachment and the image capture device. When the attachment is rigidly connected to the controller, the combination of controller and attachment move synchronously, thereby enabling the detection of location and movement of the controller by tracking the location and movement of the attachment. In another embodiment, attachment 502 is not rigidly attached and the system must track the relative positions between the attachment and the controller in order to relate the attachments location to the controller's location. Further, certain functionality provided by the attachment, such as providing ultrasound communications, is independent of the relative position between attachment and controller, thus it is not required that the controller be rigidly attached to the handle. The attachment can thus be connected via a flexible cable, for example.

The different modules in spherical attachment 502 are interconnected via a common bus, but other interconnection mechanisms are possible. Connector 504 provides the interface to connect or disconnect attachment 502 from the controller. Attachment 502 includes a processor or circuit plus memory allowing the attachment to process computer instructions. Further, attachment 502 includes communication modules such as ultrasound, infrared, and WiFi. Such communications enable the attachment to communicate with the base station or other electronic devices, which is referred to herein as a communications interface between the controller and the base station or any other electronic device. In one embodiment, the attachment operates as a modem by receiving information from the controller and forwarding the information to the base station, and vice versa.

Information received by the attachment and passed to the controller is used to change the state of the controller. For example, the controller may emit a sound, change button configuration, disable the controller, load registers in memory, send a command to the attachment to light up, etc. The information received by the base station is used by the computer program to update the state of the computer program. For example, the computer program may move an avatar on the screen or change the status of the avatar, fire a weapon, start a game, select an option in a menu, etc.

An accelerometer, a magnetometer and a gyroscope provide mechanical information related to the movement of the attachment. In one embodiment, the mechanical or inertial information is combined with other location determination information, such as via visual tracking information, in order to refine the determination of the location of the controller-attachment combo. For example, if spherical attachment 502 is occluded from view, inertial information can be used to track movement of the attachment.

An internal light emitting device allows the attachment to be lit from the inside to improve visual recognition or to provide user feedback. In one embodiment, light emitting device can emit light of a single color, and in another embodiment, light emitting device can be configured to emit light from a choice of colors. In yet another embodiment, attachment 502 includes several light emitting devices, each device being capable of emitting light of one color. The light emitting device is configurable to emit different levels of brightness. The base computing device can provide interactivity to the user holding the controller by changing the light emitting status of attachment 502, producing audio signals, or with vibrotactile feedback, etc. One feedback operation or a combination of feedback operations is possible. In one embodiment, the type of feedback is selected from a list of predefined interactivity, and based on what is occurring in a game.

A microphone and a speaker provide audio capabilities, while a battery powers the rest of the components, including the processor and the light emitting device. The battery can also be used by the handle as a second source of power. For example, if the rechargeable battery in the controller is discharged, the attachment can provide the required power so the user can continue playing instead of having to stop to recharge the controller. In one embodiment, attachment 502 does not include the battery and power to the modules in attachment 502 is obtained via an electrical connection with the power source of the handle.

A camera provides image capture capabilities and a USB module allows USB communication to and from the attachment. In one embodiment, the USB connection is used to charge the battery in the attachment. In yet another embodiment, attachment 502 includes files in memory that are transferred to the controller, or to the base station, or to both the controller and the base station. The files in memory can include configuration files or programs that are transferred for execution in the controller or the gaming system. The files can be used to identify a specific user, to configure the controller or the base system, to load a game, to add features to existing games, etc. For example, one file is a game that is loaded to the base station for playing, another file contains karaoke songs that can be used in a sing-along game, another file contains new player rosters and statistics for an update to a sports game, etc. In addition, the attachment can be used to store user parameters, such as player configuration for a particular game. The player can then use the attachment in a different gaming system to play with other players using the configuration obtained from the original gaming system.

Figure 5B:
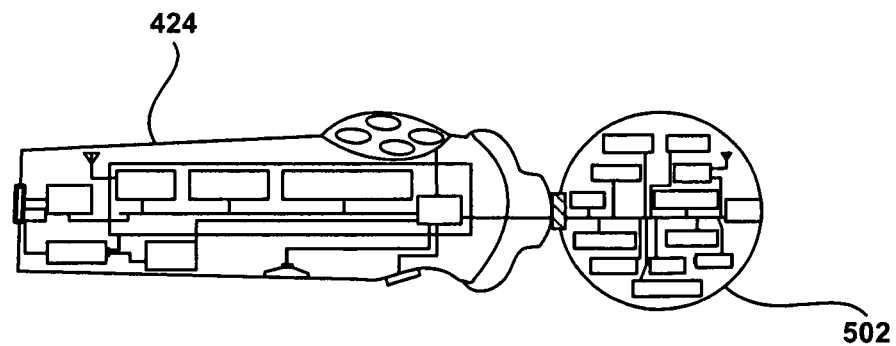

FIG. 5B illustrates an embodiment where the attachment of FIG. 5A is connected to the controller of FIG. 4. Visual communication is enhanced by the relatively large size of spherical attachment 502 facing the camera and by illuminating the attachment to improve visual recognition. Using a spherical section improves visual recognition as the ball is always perceived as a circle (or partial circle) in a captured image, independent of the orientation of the controller. In one embodiment, the ratio of the ball's diameter to the size of the largest diameter of a cross section of handle 152 is about 1, but other ratios are also possible, such as 1.2, 1.4, 0.9, 0.8, etc.

The visual cues generated by attachment 502 can be used to provide visual input to the base computing device or to provide feedback to the user or both. Additionally, the visual cues can be generated upon a command transmitted from the base station or upon the occurrence of a preconfigured condition detected at controller 424, such as pressing a button or jerking the controller at great speed. The difference combinations of visual cue generation and purpose can place the controller in different modes. In one mode, the base computing device sends a command to the controller to set the light emitted by attachment 502 in a desired state (such as lighting up green), and then the base computing device proceeds to visually track the controller. In a second mode, the base computing device sends a command to the controller to create a visual cue every times a desired event takes place, such as pressing a button to simulate firing. The base computing device can then track the visual state of the controller and detect the event at the controller by analyzing the images taken of the controller. In this mode, the visual cue can also provide feedback to the user, such as flashing a light when the button gets pushed.

In yet another mode, the primary purpose of the visual cues is to provide feedback to the user, such as for example lighting up the ball in a color indicative of a state of the game played. It should be noted that even when the purpose of the visual cue is to provide user feedback, the base computing device can also use the cues for input, such as tracking visually attachment 502 because the base computing device knows the color of the visual cue, or is able to monitor different visual cues that can be produced at any time by attachment 502.

In one embodiment, attachment 502 interacts with controller 424 via a communications interface, such as a USB interface. In another embodiment, attachment 502 is in electrical communication with one or several internal modules inside controller 424. For example, processor/circuit of attachment 502 (as seen in FIG. 5A) is connected to bus 422 of controller 424 (as seen in FIG. 4), thus allowing the processor of attachment 502 to communicate with the modules in the controller attached to the bus. The processor of attachment 502 can access memory 416 to write or read data directly, or generate interrupts for processor/circuit 412 of controller 424 to signal an external event which must be processed by processor 412.

Figure 5C:
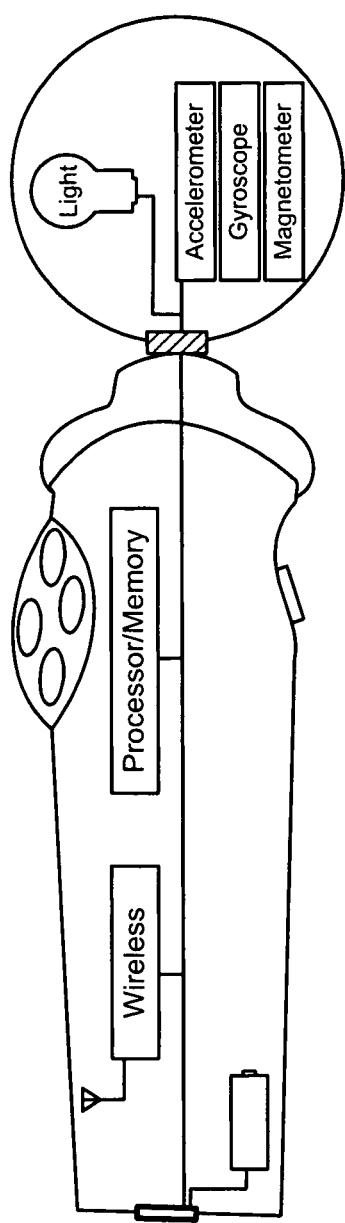

It should be noted that the embodiment depicted in FIG. 5B is exemplary and other embodiments, such as the ones shown in FIGS. 5C-H, may include fewer components. Additionally, the amount of processing performed at the controller may be more extensive, thus making the processing at the consoler less burdensome, or less extensive, requiring the processor to increase the amount of computing required to process the information received from the controller. For example, FIG. 5C shows one embodiment of an attachment that includes a light emitting device and inertial modules. The processor in the controller controls the light in the attachment, which can be used to improve image recognition or to provide user feedback. Information captured by the accelerometer, gyroscope and magnetometer is sent directly via the wireless channel to the base console, where is processed to determine location and movement. In other embodiments, only one inertial module is included in the attachment: the accelerometer, the gyroscope or the magnetometer.

Figure 5D:
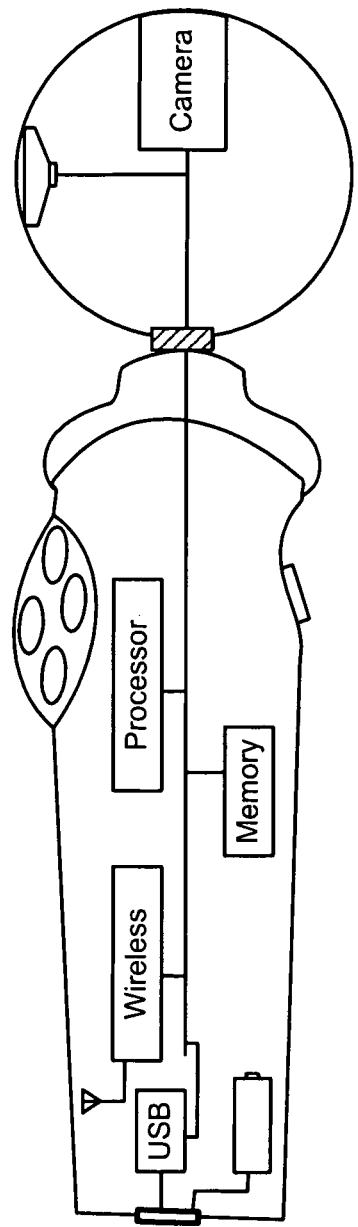
Figure 5E:
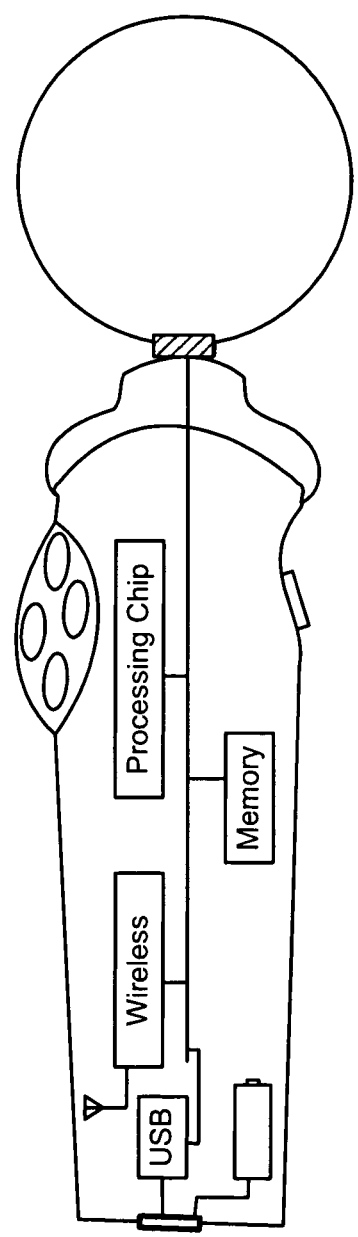

FIG. 5D shows an embodiment of a controller with an attachment that includes a speaker and a video camera. The digital information from the camera is transferred to the memory in the controller, where image processing is performed by the processor before transmitting the video data to the console for further processing. The image processing at the controller may include, video compression, filtering, eliminating frames, embedding additional information within the video image, etc. FIG. 5E pictures an embodiment that includes a passive attachment used for image recognition and location. The attachment does not include any electronic component inside.

FIG. 5F shows another embodiment for an auxiliary attachment module, also referred to as an auxiliary module. The auxiliary attachment module of FIG. 5F can be connected to the controller via the rear connector, such that the auxiliary attachment is closer than the body of the controller to the wrist of the player during normal operation of the controller. In another embodiment, the auxiliary attachment can be connected at the front end of the controller, instead of attaching a ball connector, such that the auxiliary attachment is further away than the body of the controller from the wrist of the player. The auxiliary attachment module adds extra capabilities to the controller, such as ultrasound receipt and transmittal, wireless communications, infrared communications, light emission, accelerometer, gyroscope, magnetometer, battery, charger, memory, vibrotactile, etc., or any combination thereof. Additionally, the auxiliary attachment can include a second connector for adding other attachments or for charging the controller with the rear attachment connected.

FIG. 5G illustrates a controller where the body is connected to front and rear attachment modules. In this embodiment, the auxiliary attachment in the rear provides ultrasonic capabilities for two-way ultrasound communications. In one embodiment, ultrasound communication is established with the central console to assist in controller location determination. In another embodiment, ultrasound is used to communicate with a second controller being held in another hand of the same player holding the controller. The rear attachment can include several openings distributed throughout the attachment for sending and transmitting sound. FIG. 5H illustrates another embodiment for attaching an auxiliary attachment at the front of the controller. The auxiliary attachment provides ultrasonic communication capabilities and includes an internal acoustic chamber that routes ultrasounds to and from the speaker and microphone towards the outside of the controller. The acoustic chamber allows multidirectional sound communications using only one emitter and one receiver. Lateral sound communications can also be used to communicate with other controllers being held by different players, thereby increasing the accuracy in determining the locations of the different players and controllers.

Figure 6A:
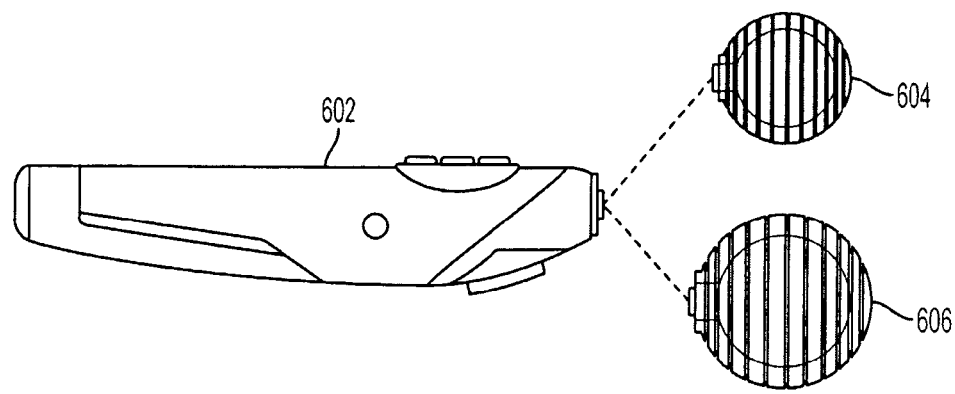
FIGS. 6A-C illustrate embodiments of attachments for expanding controller capabilities.
Figure 6B:
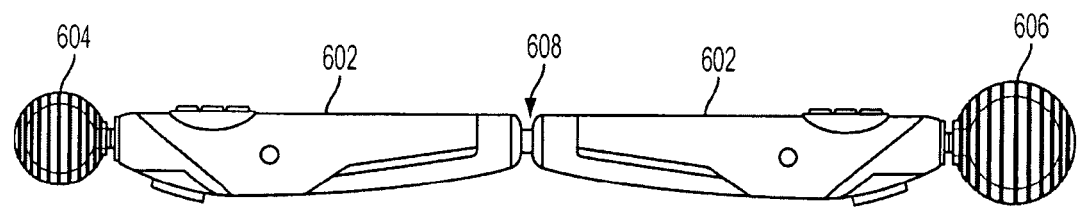
Figure 6C:
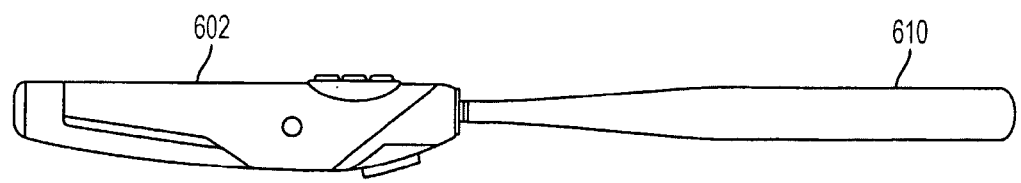

FIGS. 6A-C illustrate embodiments of attachments for expanding controller capabilities. FIG. 6A shows controller 602 that can be connected to spherical attachments 604 and 606. Attachment 606 is larger than attachment 604 and can be used in applications that require better visual location detection because of the larger surface presented to the camera, at the expense of a larger size for the controller-attachment combination. Each attachment has a unique identifier that can be transmitted to the controller and to the base station, thus interfacing with the attachment is performed according to the characteristics of the device. For example, the base station device can estimate the distance from the attachment to the image capture device according to the size of the attachment. In another embodiment, the attachment communicates some of its internal features to the controller and the base device, such as size, color, communication capabilities, etc.

FIG. 6B illustrates two controllers 602 interconnected at one end. Each controller has an attachment connected, which can be identical or different. For example, in FIG. 6B the controller on the left has a small spherical attachment 604 while the controller on the fight has a larger spherical attachment 606. The attachments can be used to track the location of the controllers or to add other capabilities, as discussed above. The controllers are interconnected via attachment 608 with two connectors, one for each controller. In one embodiment, the controllers are connector directly without using dual attachment 608.

FIG. 6C shows one embodiment of a baseball bat attachment 610 that connects to controller 602 for using the controller-attachment combination in a baseball simulation game. In one embodiment, baseball bat attachment 610 includes lights along its length that can be used for interactivity purpose, such as indicating the strength of the swing or the location where the imaginary baseball hits the baseball bat attachment during a swing of the bat.

Figure 7A:
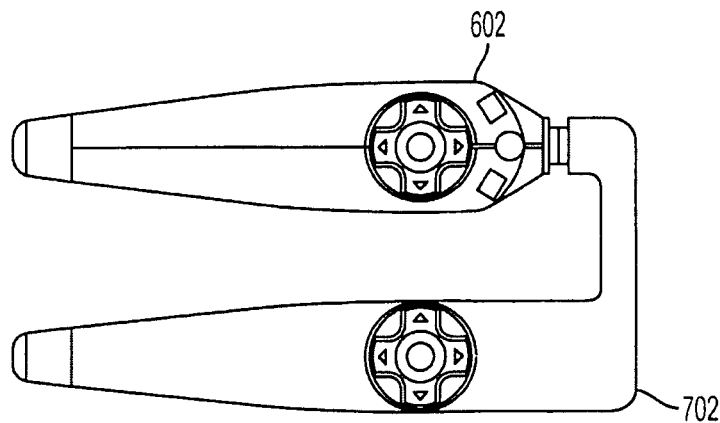
FIGS. 7A-D show additional embodiments of attachments for expanding controller capabilities including two-handed controller converter, maracas, and biometric reader.

FIGS. 7A-D show additional embodiments of attachments for expanding controller capabilities including two-handed controller converter, maracas, and biometric reader. FIG. 7A shows attachment 702 connected to controller 602. When connected, attachment 702 converts the one-hand controller into a two-hand controller combination. The combination can be used for two-handed applications, such as driving, or playing interactive games. Attachment 702 includes buttons, but other embodiments do not include buttons.

Figure 7B:
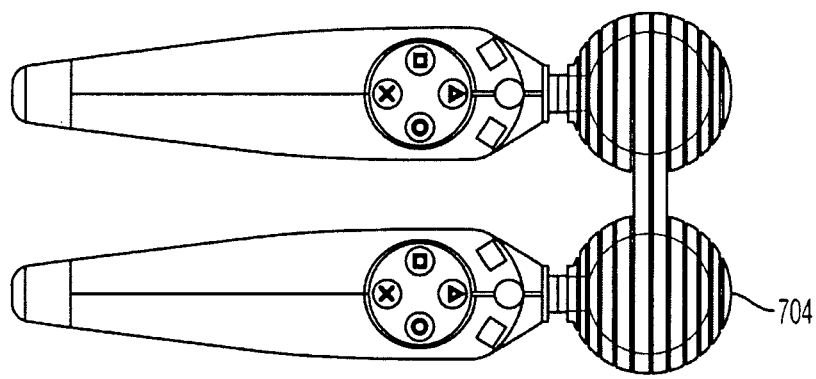

FIG. 7B shows an embodiment of attachment 704 that is used to connect two controllers. Attachment 704 includes two spherical sections for visual tracking. In another embodiment, attachment 704 includes just one spherical section that can be located in different positions, such as on the left, the right, or the middle of attachment 704.

Figure 7C:
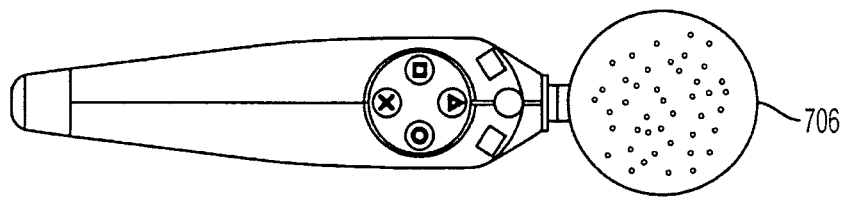
Figure 7D:
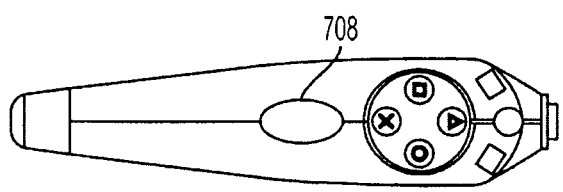

FIG. 7C illustrates attachment 706 that includes beads inside. When attachment 706 is shaken, the beads inside make a rattling noise, thus making the controller operate as maracas or as a child's rattle. FIG. 7D includes an attachment connected to the controller and provide biometric capabilities. In one embodiment, attachment 708 includes a thumb reader used to validate the identity of the person holding the controller by analyzing the biometric data provided by the attachment. The biometric data can be used to disable the controller or the base system if an unauthorized user tries to gain access. The biometric data can also be used for player recognition in order to change the controller and the base station to a state related to an existing configuration for the player. For example, a game in the base station can be restarted at a point where the player last stopped playing the game.

Figure 8A:
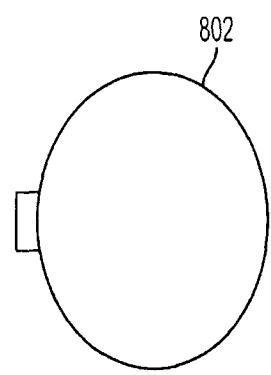
FIGS. 8A-D depict additional embodiments of attachments for expanding controller capabilities including an ellipsoidal ball, a cube, and multiple spheres.
Figure 8B:
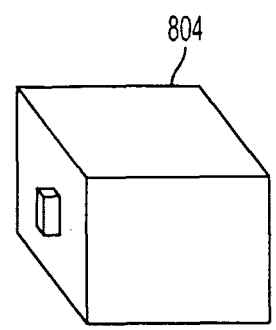
Figure 8C:
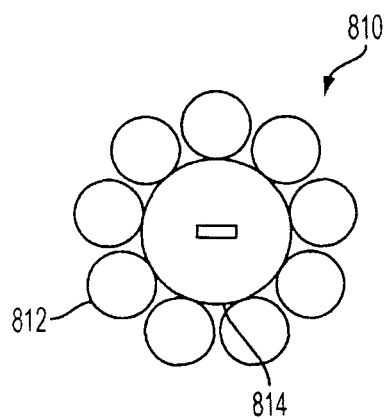
Figure 8D:
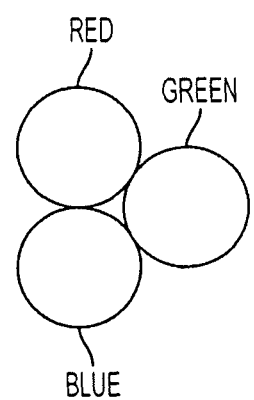

FIGS. 8A-D depict additional embodiments of attachments for expanding controller capabilities including an ellipsoidal ball, a cube, and multiple spheres. FIG. 8A shows an attachment with an ellipsoidal shape and FIG. 8B shows an attachment in the shape of a cube. FIG. 8C shows a rear view of an attachment including a sphere with a connector in the center and a ring of smaller spheres around the central sphere. FIG. 8D includes an attachment formed by the union of three different spheres. The spheres are configured to be facing the image capture device during operation of the controller. Each of the spheres can be lit in a different color, red, green and blue. In another embodiment each of the spheres can lit in either red, green, or blue, providing for multiple combinations.

Figure 9:
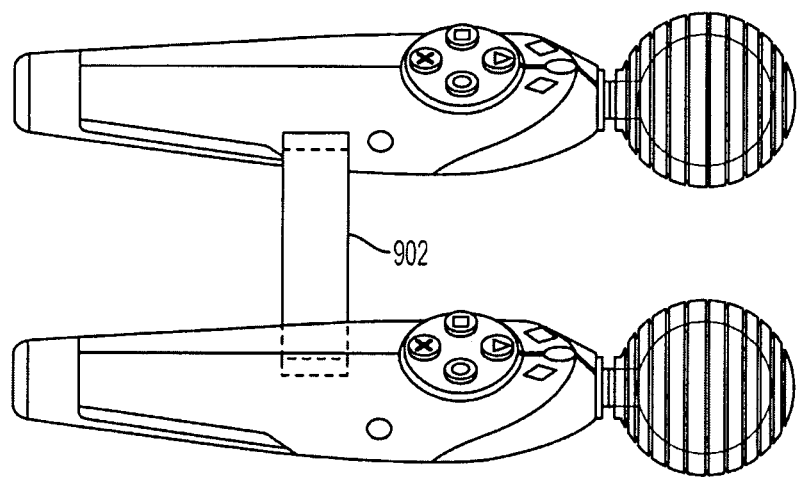
FIG. 9 illustrates an embodiment of an attachment for connecting two controllers together.

FIG. 9 illustrates an embodiment of attachment 902 for connecting two controllers together. Attachment 902 has two connectors for coupling two respective controllers and form a two-hand controller with an H shape. In one embodiment attachment 902 acts as a mechanical connector and in other embodiments attachment 902 also provides an electrical communication between the controllers enabling the controllers to interact. For example, when connected, one of the controllers may act as the master while the other one works as a slave commanded by the master.

When the connector rigidly connects to both controllers, the combination unit moves in unison, thus visually tracking movement of one of the controllers is enough to detect movement and location of the combination. In other embodiment, both controllers have spherical attachments connected and they are both tracked by the base station for redundancy and improved accuracy.

Figure 10:
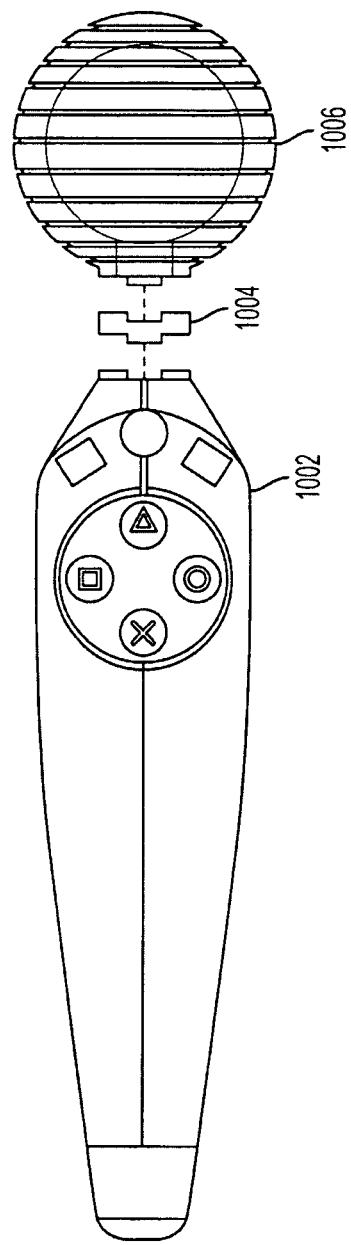
FIG. 10 shows an attachment with connectors for a controller and for a second attachment, according to one embodiment.

FIG. 10 shows an attachment with connectors for a controller and for a second attachment, according to one embodiment. Ring attachment 1004 has connectors on two ends, which can be used to connect controller 1002 and attachment 1006 or two controllers together (not shown). When attachment 1004 is connected to controller 1002 and to attachment 1006, attachment 1006 can communicate with controller 1002 in two modes. In one mode, controller 1002 sends information to attachment 1004, which processes the information and then forwards the information to attachment 1006, and vice versa. In a second mode, controller 1002 sends the information directly to attachment 1006 and attachment 1004 acts as an electrical conduit for the information. In this second mode, attachment 1006 may be operating as if it were directly connected to controller 1002 and may not be "aware" that attachment 1004 is connected in between. This allows controller 1002 to have several attachments without the complexity of having each attachment handle the complexity of the different interconnection methods.

Attachments 1004 and 1006 add features to controller 1002. For example, attachment 1004 can provide ultrasonic communication, an input wheel, or an extra battery, while attachment 1006 provides a visual interface or a microphone.

Figure 11A:
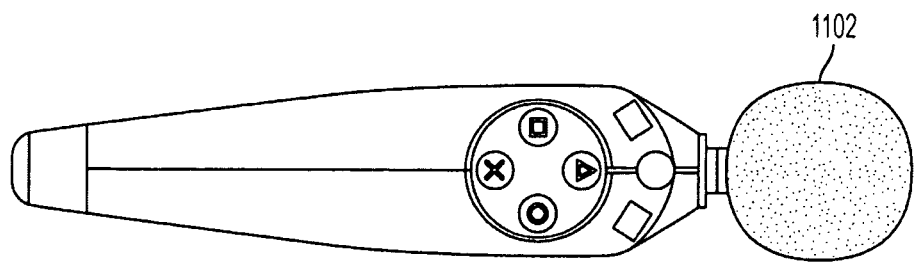
FIGS. 11A-C illustrate additional embodiments of attachments for expanding controller capabilities including a microphone, a flashlight, and attachment connected in the back of the controller.
Figure 11B:
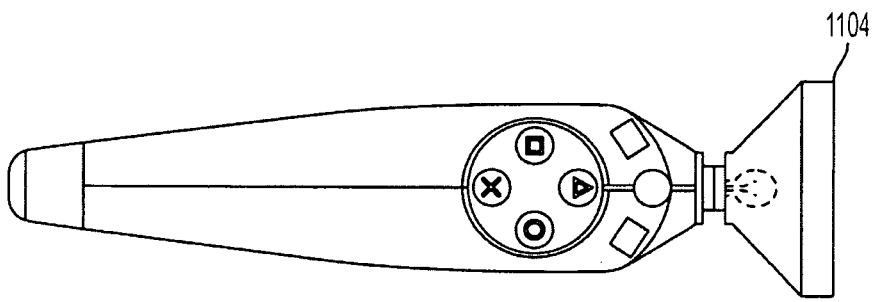
Figure 11C:

FIGS. 11A-C illustrate additional embodiments of attachments for expanding controller capabilities including a microphone, a flashlight, and attachment connected in the back of the controller. FIG. 11A shows a controller with microphone attachment 1102. Attachment 1102 contains a microphone and a soft shell to protect the microphone and to let sound reach the microphone with low sound resistance. The combination is used in applications such as Karaoke or voice-command entry. In one embodiment, the microphone is a directional microphone which attenuates or completely eliminates sounds coming from preconfigured directions.

FIG. 11B illustrates adding attachment 1104 to convert the controller into a flashlight, and FIG. 11C shows attachment 1106 that connects to the end of the controller closer to the player when the controller is in use. In one embodiment, attachment 1106 is a rechargeable battery used to power the controller.

FIGS. 12A-D illustrate embodiments for connecting the attachment to the controller. FIG. 12A shows controller 1202 and attachment 1208. Controller 1202 includes slot 1204 where connector 1206 from attachment 1208 fits. The connector establishes a mechanical coupling and can include electrical contacts. Attachment ring 120, as seen in FIG. 12B, includes an aperture where protruding part 1212 fits. Once protruding part 1212 is inside attachment ring 1210, attachment 1208 can rotate to securely fix attachment 1208 with controller 1202. The attachment can rotate to several positions that are detected by different connectors in attachment ring 1210. The different positions can be used as an input to the controller, for example to set a level of brightness for attachment 1208.

FIG. 12C shows controller and attachment in a connected position and FIG. 12D shows a frontal view of attachment 1208. It should be appreciated that the embodiments illustrated in FIGS. 12A-D are exemplary forms of connectors. Other embodiments may utilize different mechanical and electrical connections. The embodiments illustrated in FIGS. 12A-D should therefore not be interpreted to be exclusive or limiting, but rather exemplary or illustrative.

Figure 13A:
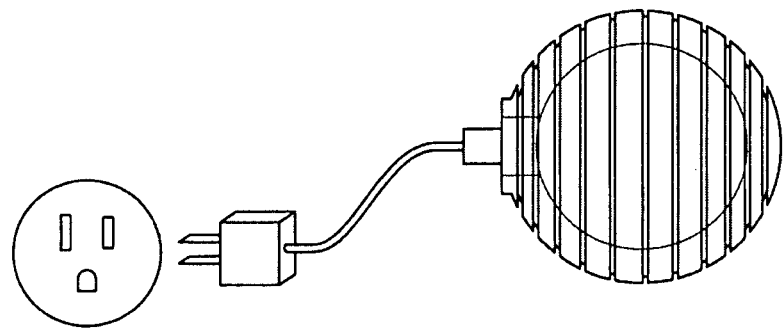
FIGS. 13A-B shows different embodiments for charging an attachment.
Figure 13B:
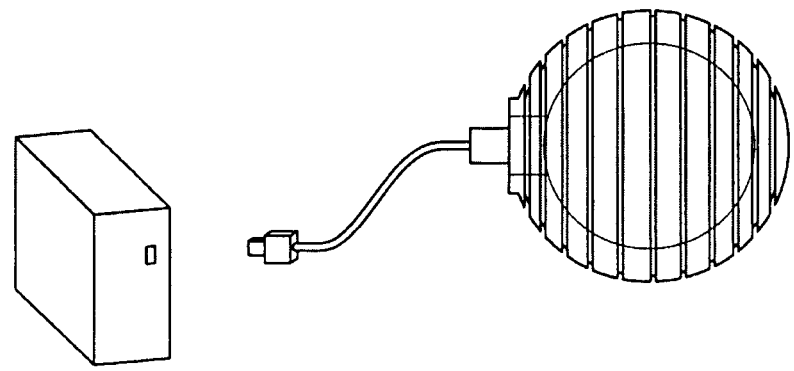

FIGS. 13A-B shows different embodiments for charging an attachment. FIG. 13A shows an spherical attachment that connects to AC power via a cord that plugs into the wall outlet and to the connector in the attachment. In one embodiment, the cord includes a transformer AC/DC, and in another embodiment, the transformer is part of the attachment. FIG. 13B illustrates charging the attachment via a cable that connects to a port in a computing device. In one example, the port is a USB port. The USB connection can also be used to communicate with the computing device.

Figure 14A:
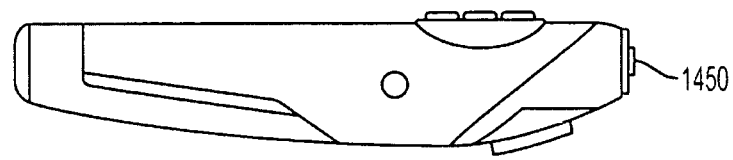
FIGS. 14A-C illustrate embodiments for different connectors in a controller.
Figure 14B:
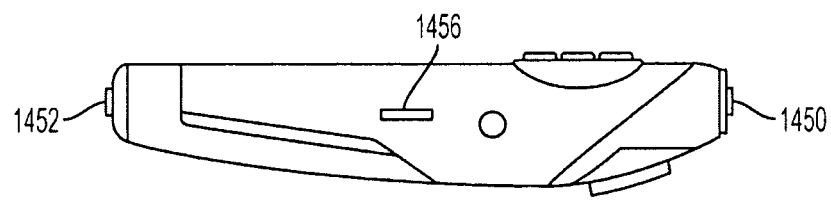
Figure 14C:
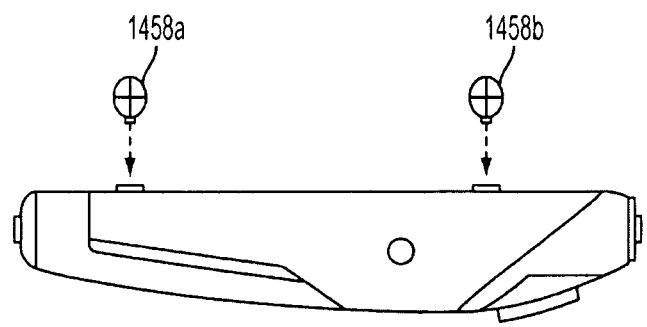

FIGS. 14A-C illustrate embodiments for different connectors in a controller. FIG. 14A depicts a controller with connector 1450 at the front end of the controller. FIG. 14B shows a controller with connectors 1450, 1452, and 1456 placed at the front, the back and the body of the controller, respectively. FIG. 14C illustrates a controller with crosshair attachments 1458a-b at the top. The crosshair attachments can be used for aiming in shooting games.

Figure 15:
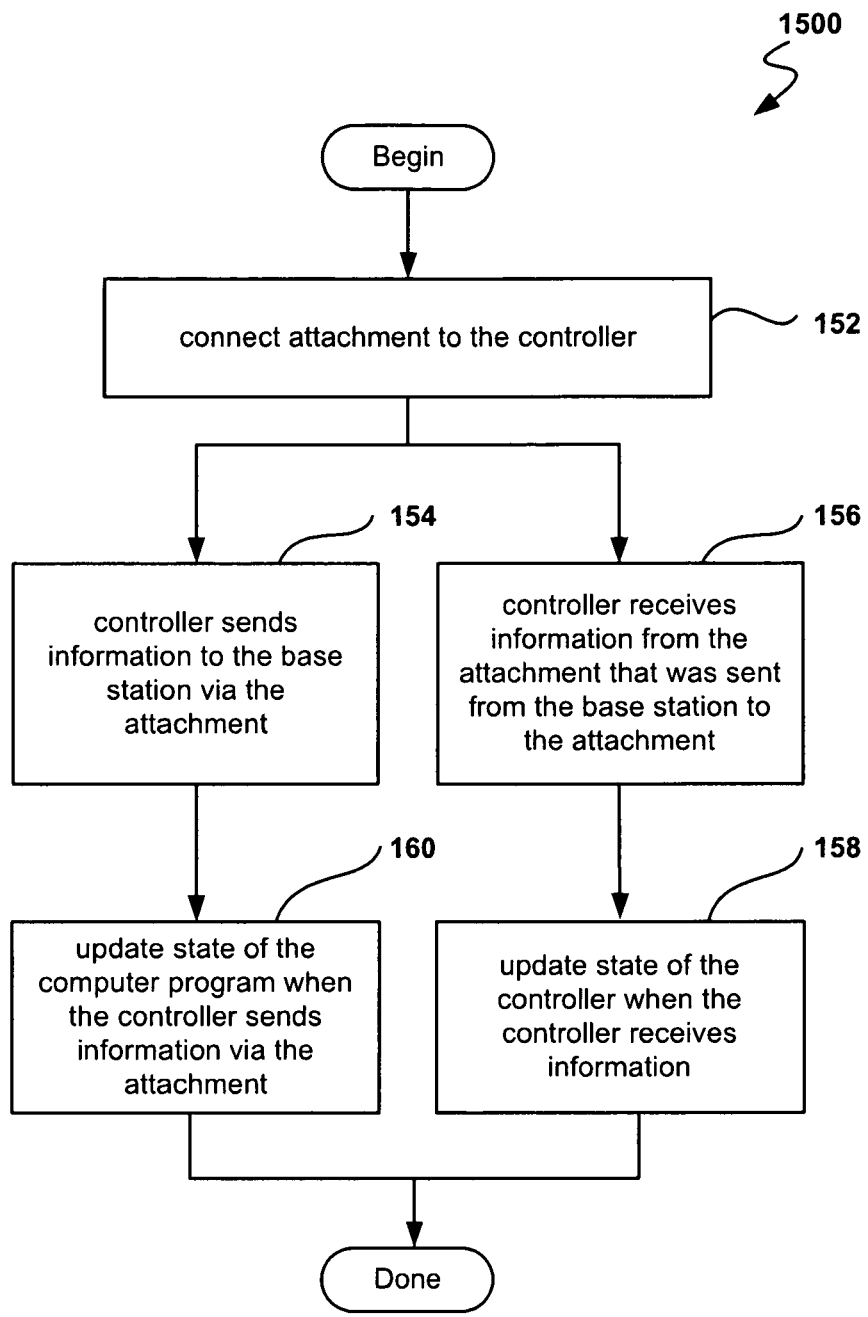
FIG. 15 depicts one embodiment of a method for interfacing with a gaming system to interact with a computer program rendering interactive content on a display.

FIG. 15 depicts one embodiment of a method for interfacing with a gaming system to interact with a computer program rendering interactive content on a display. In operation 152, an attachment is connected to the controller, which enables the controller to send or receive information, or both send and receive information. In operation 154, the controller sends information to the base station via the attachment, and in operation 156 the controller receives information from the attachment that was sent from the base station to the attachment. It should be noted that although operations 154 and 156 are represented in parallel flows, operations 154 and 156 are considered independent and can be performed simultaneously, or in the alternative. Further, operations 154 and 156 can be performed at different times and operations 154 and 156 are not required to be performed in parallel synchronously, although they can performed at the same time in some instances.

After the controller sends information, a state of the computer program is updated in operation 160. After the controller receives information, a state of the controller is updated in operation 158.

Figure 16:
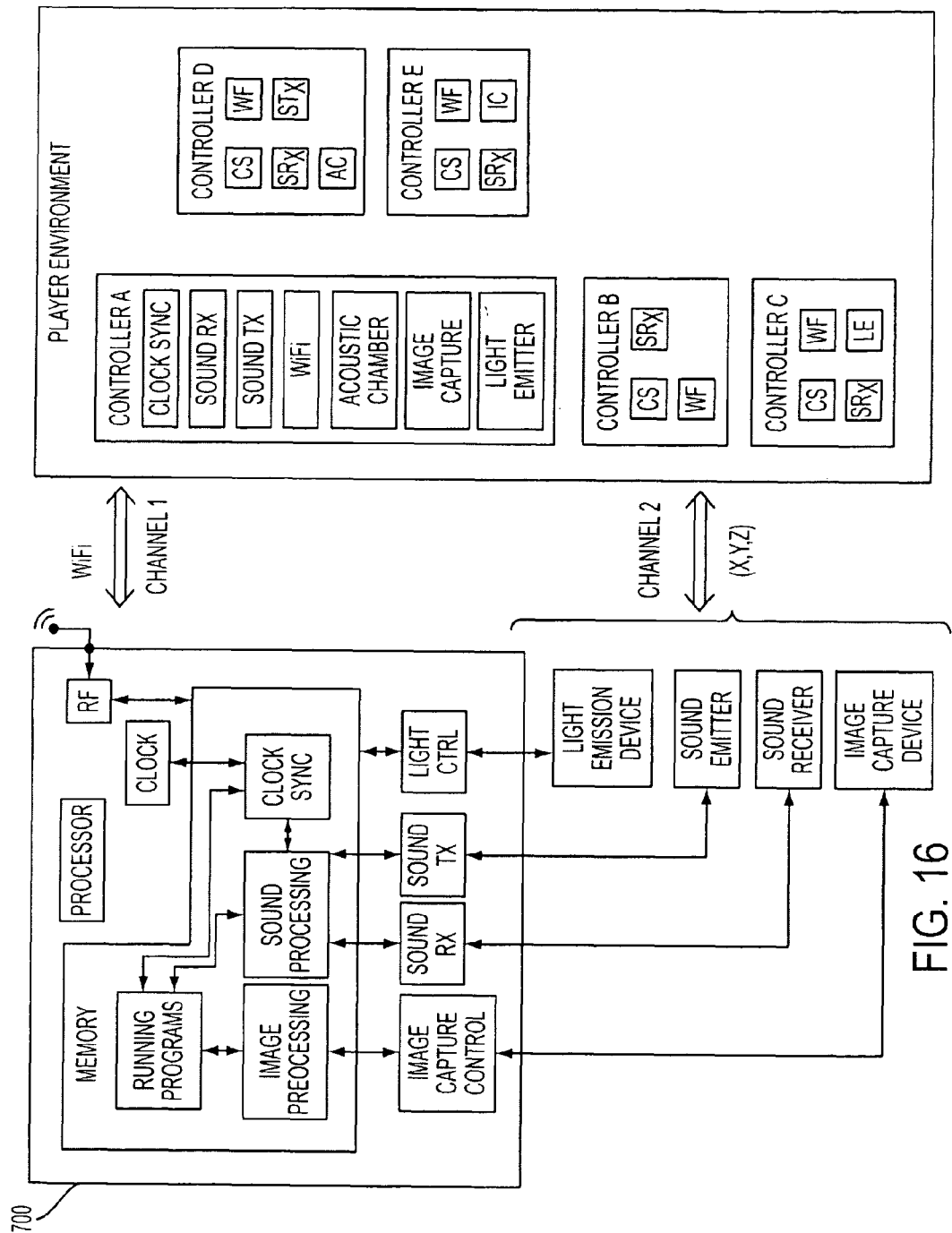
FIG. 16 is a block diagram of the different elements in the entertainment system in accordance with one embodiment.

FIG. 16 is a block diagram of the different elements in the entertainment system in accordance with one embodiment. The base computing system and its components are located on the left side of FIG. 16, and the player environment is shown on the right side. The base computing system includes a processor, a memory area, a clock, and communication interfaces. The communication interfaces include a radio-frequency (RF) interface for wireless communications to the controllers, such as communications using the WiFi™ protocol. Other communications methods include image capturing, sound transmission and reception (ultrasonic in this embodiment), and light emitters.

The different communication devices connected to the base computing system connect to the respective controllers inside the computing system. The memory area includes running programs, an image processing area, a sound processing area, and a clock synchronization area. Running programs include a gaming program, image processing program, sound processing program, clock synchronization program, etc. These programs use the corresponding areas of memory, such as the image processing area containing image data, the sound processing area containing ultrasound communications data, and the clock synchronization area used for the synchronization with remote devices.

Several embodiments for controller configuration are shown in the player environment area. Controller A represents a "fully loaded" controller with many of the features previously described. Controller A includes a Clock Synchronization (CS) module used for clock synchronization with the base computing system; a Sound Receiver (SRx) for receiving ultrasonic data; a Sound Transmitter (SRx) for sending ultrasonic data; a WiFi (WF) module for WiFi communications with computing system 700; an Acoustic Chamber (AC) for conducting sound to and from the front and/or the sides of the controller; an Image Capture (IC) device, such as a digital video camera, for capturing image data; and a Light Emitter (LE) in the infrared or visible spectrum for easier image recognition from the image processing module at computing system 700.

Additionally, controller A includes a connector (not shown) configured to be coupled and decoupled to an attachment, such as a spherical section, to improve image recognition by a remote capture device. The light created by the light emitter can be in the infrared or the visible spectrum, therefore the image capture device will work in the same light spectrum. The different components in Controller A can be implemented as separate devices or modules inside Controller A. In another embodiment, the different components in Controller A are grouped into a smaller number of integrated components enabling a more compact implementation. The various controllers can also include one or more USB plugs, to enable charging of the controllers when connected to the game station or a computer.

According to the intended use of a given controller, simpler configurations can be used with less features than those described for controller A. Some embodiments of simpler devices are shown with respect to controllers B-E utilizing a subset of features from those described for controller A. The person skilled in the art will readily appreciate that similar configurations are possible within the spirit of the invention by adding or subtracting components, as long as the principles of the invention are maintained.

Figure 17:
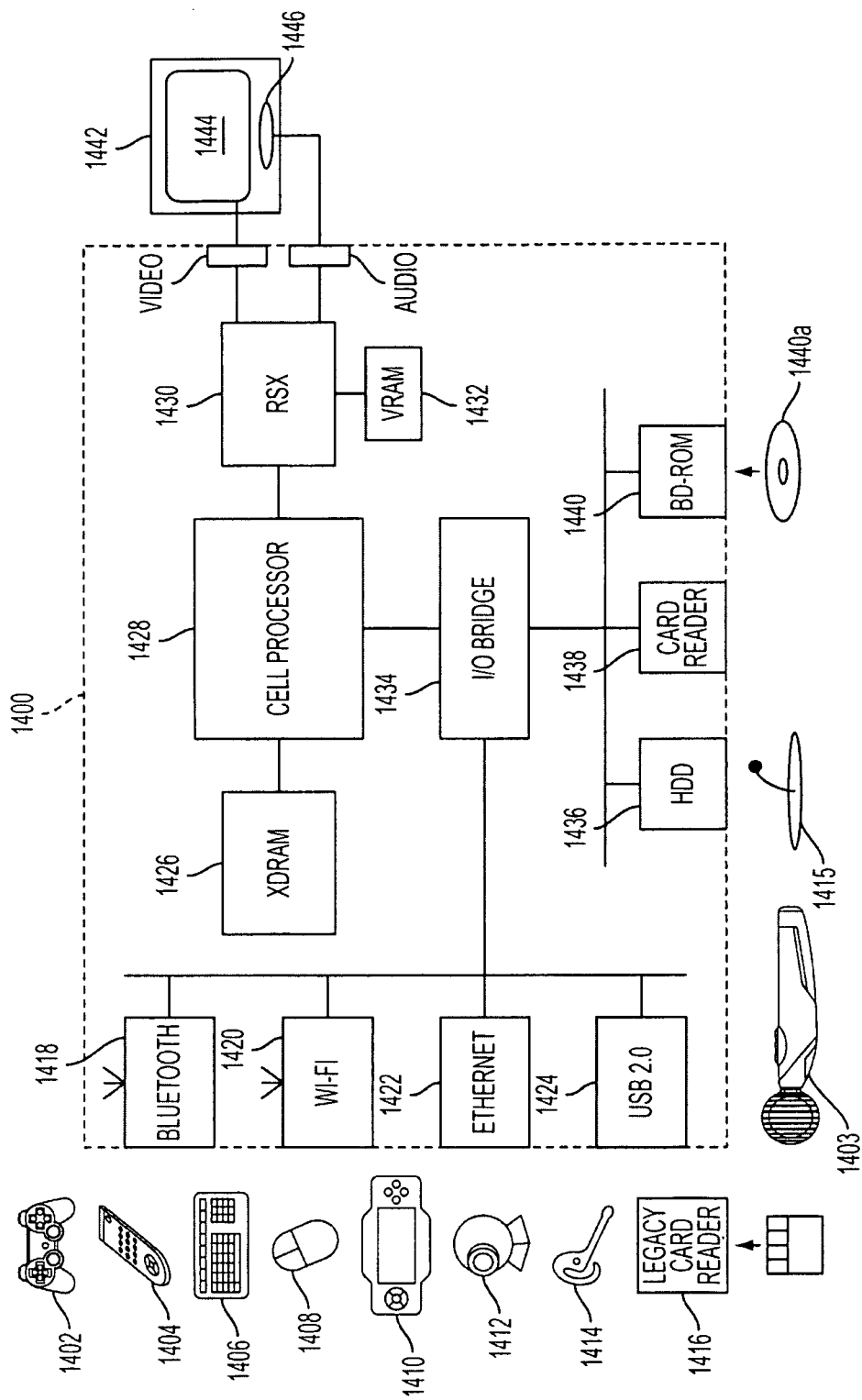
FIG. 17 illustrates hardware and user interfaces that may be used to determine controller location, in accordance with one embodiment of the present invention.

FIG. 17 illustrates hardware and user interfaces that may be used to determine controller location, in accordance with one embodiment of the present invention. FIG. 17 schematically illustrates the overall system architecture of the Sony® Playstation 30 entertainment device, a console that may be compatible for implementing an expandable controller in accordance with one embodiment of the present invention. A system unit 1400 is provided, with various peripheral devices connectable to the system unit 1400. The system unit 1400 comprises: a Cell processor 1428; a Rambus® dynamic random access memory (XDRAM) unit 1426; a Reality Synthesizer graphics unit 1430 with a dedicated video random access memory (VRAM) unit 1432; and an I/O bridge 1434. The system unit 1400 also comprises a Blu Ray® Disk BD-ROM® optical disk reader 1440 for reading from a disk 1440a and a removable slot-in hard disk drive (HDD) 1436, accessible through the I/O bridge 1434. Optionally the system unit 1400 also comprises a memory card reader 1438 for reading compact flash memory cards, Memory Stick® memory cards and the like, which is similarly accessible through the I/O bridge 1434.

The I/O bridge 1434 also connects to six Universal Serial Bus (USB) 2.0 ports 1424; a gigabit Ethernet port 1422; an IEEE 802.11b/g wireless network (Wi-Fi) port 1420; and a Bluetooth® wireless link port 1418 capable of supporting of up to seven Bluetooth connections.

In operation, the I/O bridge 1434 handles all wireless, USB and Ethernet data, including data from one or more game controllers 1402-1403. For example when a user is playing a game, the I/O bridge 1434 receives data from the game controller 1402-1403 via a Bluetooth link and directs it to the Cell processor 1428, which updates the current state of the game accordingly.

The wireless, USB and Ethernet ports also provide connectivity for other peripheral devices in addition to game controllers 1402-1403, such as: a remote control 1404; a keyboard 1406; a mouse 1408; a portable entertainment device 1410 such as a Sony Playstation Portable® entertainment device; a video camera such as an EyeToy® video camera 1412; a microphone headset 1414; and a microphone 1415. Such peripheral devices may therefore in principle be connected to the system unit 1400 wirelessly; for example the portable entertainment device 1410 may communicate via a Wi-Fi ad-hoc connection, whilst the microphone headset 1414 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 1416 may be connected to the system unit via a USB port 1424, enabling the reading of memory cards 1448 of the kind used by the Playstation® or Playstation 2® devices.

The game controllers 1402-1403 are operable to communicate wirelessly with the system unit 1400 via the Bluetooth link, or to be connected to a USB port, thereby also providing power by which to charge the battery of the game controllers 1402-1403. Game controllers 1402-1403 can also include memory, a processor, a memory card reader, permanent memory such as flash memory, light emitters such as LEDs or infrared lights, microphone and speaker for ultrasound communications, an acoustic chamber, a digital camera, an internal clock, a recognizable shape such as a spherical section facing the game console, and wireless communications using protocols such as Bluetooth®, WiFi™, etc.

Game controller 1402 is a controller designed to be used with two hands, and game controller 1403 is a single-hand controller with a connector for expansion capabilities via a hardware attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1404 is also operable to communicate wirelessly with the system unit 1400 via a Bluetooth link. The remote control 1404 comprises controls suitable for the operation of the Blu Ray™ Disk BD-ROM reader 1440 and for the navigation of disk content.

The Blu Ray™ Disk BD-ROM reader 1440 is operable to read CD-ROMs compatible with the Playstation and PlayStation 2 devices, in addition to conventional pre-recorded and recordable CDs, and so-called Super Audio CDs. The reader 1440 is also operable to read DVD-ROMs compatible with the Playstation 2 and PlayStation 3 devices, in addition to conventional pre-recorded and recordable DVDs. The reader 1440 is further operable to read BD-ROMs compatible with the Playstation 3 device, as well as conventional pre-recorded and recordable Blu-Ray Disks.

The system unit 1400 is operable to supply audio and video, either generated or decoded by the Playstation 3 device via the Reality Synthesizer graphics unit 1430, through audio and video connectors to a display and sound output device 1442 such as a monitor or television set having a display 1444 and one or more loudspeakers 1446. The audio connectors 1450 may include conventional analogue and digital outputs whilst the video connectors 1452 may variously include component video, S-video, composite video and one or more High Definition Multimedia Interface (HDMI) outputs. Consequently, video output may be in formats such as PAL or NTSC, or in 720 p, 1080 i or 1080 p high definition.

Audio processing (generation, decoding and so on) is performed by the Cell processor 1428. The Playstation 3 device's operating system supports Dolby® 5.1 surround sound, Dolby® Theatre Surround (DTS), and the decoding of 7.1 surround sound from Blu-Ray® disks.

In the present embodiment, the video camera 1412 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 1400. The camera LED indicator is arranged to illuminate in response to appropriate control data from the system unit 1400, for example to signify adverse lighting conditions. Embodiments of the video camera 1412 may variously connect to the system unit 1400 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 1400, an appropriate piece of software such as a device driver should be provided. Device driver technology is well-known and will not be described in detail here, except to say that the skilled man will be aware that a device driver or similar software interface may be required in the present embodiment described.

Figure 18:
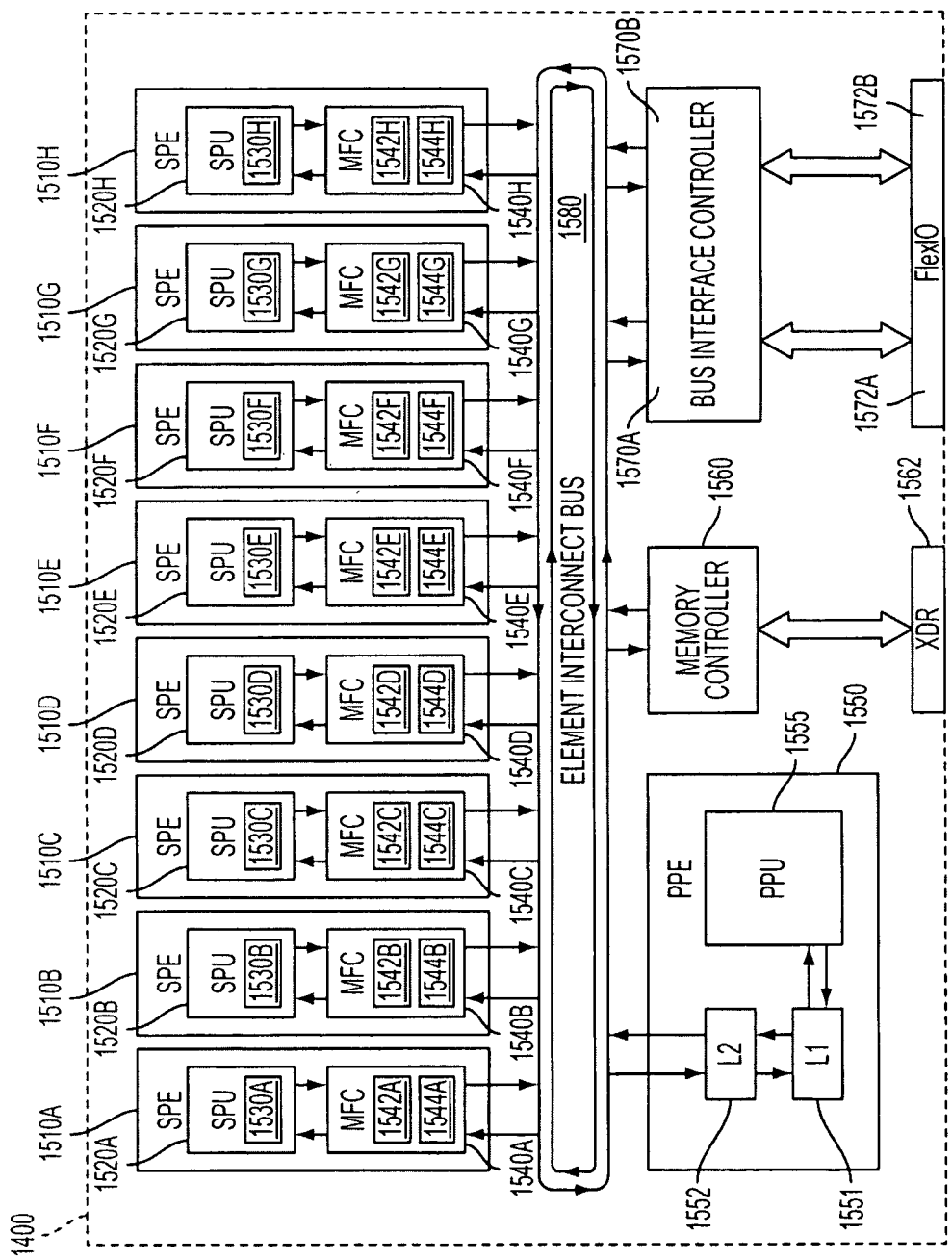
FIG. 18 illustrates additional hardware that may be used to process instructions, in accordance with one embodiment of the present invention.

FIG. 18 illustrates additional hardware that may be used to process instructions, in accordance with one embodiment of the present invention. Cell processor 1428 has an architecture comprising four basic components: external input and output structures comprising a memory controller 1560 and a dual bus interface controller 1570A, B; a main processor referred to as the Power Processing Element 1550; eight co-processors referred to as Synergistic Processing Elements (SPEs) 1510A-H; and a circular data bus connecting the above components referred to as the Element Interconnect Bus 1580. The total floating point performance of the Cell processor is 218 GFLOPS, compared with the 6.2 GFLOPs of the Playstation 2 device's Emotion Engine.

The Power Processing Element (PPE) 1550 is based upon a two-way simultaneous multithreading Power 1470 compliant PowerPC core (PPU) 1555 running with an internal clock of 3.2 GHz. It comprises a 512 kB level 2 (L2) cache and a 32 kB level 1 (L1) cache. The PPE 1550 is capable of eight single position operations per clock cycle, translating to 25.6 GFLOPs at 3.2 GHz. The primary role of the PPE 1550 is to act as a controller for the Synergistic Processing Elements 1510A-H, which handle most of the computational workload. In operation the PPE 1550 maintains a job queue, scheduling jobs for the Synergistic Processing Elements 1510A-H and monitoring their progress. Consequently each Synergistic Processing Element 1510A-H runs a kernel whose role is to fetch a job, execute it and synchronized with the PPE 1550.

Each Synergistic Processing Element (SPE) 1510A-H comprises a respective Synergistic Processing Unit (SPU) 1520A-H, and a respective Memory Flow Controller (MFC) 1540A-H comprising in turn a respective Dynamic Memory Access Controller (DMAC) 1542A-H, a respective Memory Management Unit (MMU) 1544A-H and a bus interface (not shown). Each SPU 1520A-H is a RISC processor clocked at 3.2 GHz and comprising 256 kB local RAM 1530A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 1520A-H does not directly access the system memory XDRAM 1426; the 64-bit addresses formed by the SPU 1520A-H are passed to the MFC 1540A-H which instructs its DMA controller 1542A-H to access memory via the Element Interconnect Bus 1580 and the memory controller 1560.

The Element Interconnect Bus (EIB) 1580 is a logically circular communication bus internal to the Cell processor 1428 which connects the above processor elements, namely the PPE 1550, the memory controller 1560, the dual bus interface 1570A,B and the 8 SPEs 1510A-H, totaling 12 participants. Participants can simultaneously read and write to the bus at a rate of 8 bytes per clock cycle. As noted previously, each SPE 1510A-H comprises a DMAC 1542A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96 B per clock, in the event of full utilization through arbitration between participants. This equates to a theoretical peak bandwidth of 307.2 GB/s (gigabytes per second) at a clock rate of 3.2 GHz.

The memory controller 1560 comprises an XDRAM interface 1562, developed by Rambus Incorporated. The memory controller interfaces with the Rambus XDRAM 1426 with a theoretical peak bandwidth of 25.6 GB/s.

The dual bus interface 1570A,B comprises a Rambus FlexIO® system interface 1572A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 1428 to the Reality Simulator graphics unit 1430 will typically comprise display lists, being a sequence of commands to draw vertices, apply textures to polygons, specify lighting conditions, and so on.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. In one embodiment, the apparatus can be specially constructed for the required purpose (e.g. a special purpose machine), or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A controller for interfacing with a gaming system to interact with a computer program rendering interactive content on a display, the controller comprising:
   a handle having an elongated shape including a first end and a second end opposite the first end, the handle configured to be held by a single hand of a user for operation of the controller, the second end configured for presentation towards the display during operation; and
   a handle connector defined at the second end of the handle, the handle connector being defined for coupling an attachment to the handle; and
   a circuit inside the handle;
   wherein the controller provides different capabilities as defined by attachments that interchangeably couple to the controller via the handle connector; wherein a first attachment provides an illumination object for communication with the gaming system, wherein the first attachment enables the gaming system to visually track a location of the controller via the illumination object and illumination of the illumination object is configured to be at least partially controlled by signals received from the gaming system.

2. The controller as recited in claim 1, wherein the first attachment has a shape selected from a group consisting of a spherical section, a partial sphere, an imperfect sphere, an elongated ball, or a cube.

3. The controller as recited in claim 1, wherein the gaming system receives visual information from the first attachment via an image capture device connected to the gaming system, the gaming system analyzing the image from the image capture device to determine the location of the illumination object.

4. The controller as recited in claim 1, further including a second handle connector defined at the first end of the handle.

5. The controller as recited in claim 1, wherein a second attachment includes a speaker.

6. The controller as recited in claim 1,
   wherein the controller includes a processor, wherein a third attachment is defined to generate interrupts for the processor when the third attachment is coupled to the handle.

7. The controller as recited in claim 1, wherein a fourth attachment includes buttons that can be operated by a user.

8. The controller as recited in claim 1, wherein a fifth attachment includes a biometric input device, wherein biometric input obtained by the biometric input device is defined to enable and disable one of the handle or resources in the gaming system.

9. The controller as recited in claim 1, wherein a sixth attachment provides ultrasonic communication capabilities to the controller.

10. The controller as recited in claim 1, wherein an eleventh attachment includes one or more inertial sensors, wherein information captured by the one or more inertial sensors is sent to the gaming system to determine location and movement of the controller.

11. The controller as recited in claim 1, wherein the illumination object includes at least one surface of translucent material.

12. The controller as recited in claim 1, wherein a twelfth attachment includes a communications interface for exchanging information with the gaming system, wherein the twelfth attachment is defined to communicate with a circuit in the handle, wherein the circuit is defined to exchange information with the gaming system via the communications interface.

13. A system for playing games, the system comprising:
a controller configured to be held and operated by a single hand of a user, the controller providing different capabilities as defined by attachments that can interchangeably be connected and disconnected to the controller;
an image capture device that takes images of the controller and the attachments; and
a base gaming system connected to the image capture device and interfaced with a first attachment when the first attachment is connected to the controller, wherein the first attachment provides an illumination object for communication with the gaming system, the first attachment enabling the base gaming system to visually track a location of the controller via the images taken by the image capture device, wherein illumination of the illumination object is controlled by signals received from the gaming system.

14. The system as recited in claim 13, further including, a second controller, wherein a seventh attachment physically connects simultaneously to the controller and to the second controller to form a two handed controller.

15. The system as recited in claim 13, wherein an eight attachment and the controller are rigidly attached when the eight attachment is connected to the controller, the eight attachment and the controller being defined to be held and operated as a two hand controller when the eight attachment is connected to the controller.

16. The system as recited in claim 13, wherein a ninth attachment has a rechargeable battery, wherein the controller receives additional electrical power from the rechargeable battery when the ninth attachment is physically connected to the controller.

17. The system as recited in claim 13, wherein a tenth attachment further includes a crosshair shape for aiming the controller towards a target.

18. A controller for interfacing with a gaming system to interact with a computer program rendering interactive content on a display, the controller comprising:
a handle having an elongated shape including a first end and a second end opposite the first end, the handle configured to be held by a single hand of a user for operation of the controller, the second end configured for presentation towards the display during operation; and
a handle connector defined at the second end of the handle; and
a circuit inside the handle, wherein the controller provides different capabilities as defined by attachments that interchangeably couple to the controller via the handle connector; wherein a first attachment provides an illumination object for communication with the gaming system, the first attachment enables the gaming system to visually track a location of the controller via the illumination object, wherein illumination of the illumination object is controlled by signals received from the gaming system.

19. A method for interfacing a controller with a gaming system to interact with a computer program, the method comprising:
taking images, with an image capture device coupled to a gaming system, of a controller configured to be held and operated by a single hand of a user, the controller providing different capabilities as defined by attachments that can interchangeably be connected and disconnected to the controller, wherein the controller includes a handle connector for coupling any attachment to the controller, wherein a first attachment provides an illumination object for communication with the gaming system and the gaming system is configured to provide signals to at least partially control illumination of the illuminating object; and
tracking visually, by the gaming system, a location of the controller via the images when the first attachment is connected to the controller, the tracking including determining a location of the first attachment from the images.

20. The method as recited in claim 19 further including, receiving inertial information from the controller at the gaming system; and
tracking the location and movement of the controller based on a combination of the received inertial information and the images captured by the image capture device.

* * * * *